US007484181B2

(12) United States Patent
Duperrouzel et al.

(10) Patent No.: US 7,484,181 B2
(45) Date of Patent: Jan. 27, 2009

(54) WEB PAGE DISPLAY SYSTEM

(75) Inventors: Brian Gerard Duperrouzel, San Francisco, CA (US); Angus McNab Chassels IV, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 11/158,495

(22) Filed: Jun. 21, 2005

(65) Prior Publication Data

US 2005/0235220 A1  Oct. 20, 2005

Related U.S. Application Data

(63) Continuation of application No. 10/985,529, filed on Nov. 9, 2004, which is a continuation of application No. 09/124,468, filed on Jul. 28, 1998, now Pat. No. 6,832,355.

(51) Int. Cl.
    G06F 13/00 (2006.01)
    G06F 15/00 (2006.01)
(52) U.S. Cl. .................. 715/788; 715/790; 715/736
(58) Field of Classification Search .......... 715/513, 715/800, 805, 781, 760, 736–739, 763–765, 715/788–790, 797, 792
    See application file for complete search history.

(56) References Cited

U.S. PATENT DOCUMENTS

| 5,414,809 | A | | 5/1995 | Hogan et al. |
| 5,499,334 | A | | 3/1996 | Staab |
| 5,513,342 | A | | 4/1996 | Leong et al. |
| 5,623,589 | A | | 4/1997 | Needham et al. |
| 5,694,561 | A | * | 12/1997 | Malamud et al. ............ 715/805 |
| 5,712,995 | A | | 1/1998 | Cohn |
| 5,734,380 | A | | 3/1998 | Adams et al. |
| 5,771,042 | A | * | 6/1998 | Santos-Gomez ............ 715/800 |
| 5,900,875 | A | | 5/1999 | Haitani et al. |
| 5,920,315 | A | | 7/1999 | Santos-Gomez |
| 5,959,623 | A | | 9/1999 | van Hoff et al. |
| 5,973,692 | A | | 10/1999 | Knowlton et al. |
| 6,008,809 | A | | 12/1999 | Brooks |
| 6,072,474 | A | | 6/2000 | Morimura et al. |
| 6,119,135 | A | * | 9/2000 | Helfman ...................... 715/513 |

(Continued)

OTHER PUBLICATIONS

IBM, Systems Application Architecture Common User Access, Advanced Interface Design Guide, pp. 95-101, 1989.
"XANA Web Browser Home," http://gamma.nic.fi/~point/xana.htm, dated Jun. 22, 2000, 2 pages.

(Continued)

*Primary Examiner*—Kevin Nguyen
(74) *Attorney, Agent, or Firm*—Klarquist Sparkman, LLP

(57) ABSTRACT

A display system displays web pages from web sites located on data communications networks such as the Internet network. The display system has display controls and a plurality of non-overlapping display areas. Each display area has independent display area controls and independently displays a web page. The display controls include a sizing control operable by a user to alter a size of all display areas simultaneously with one control action. The display system in an embodiment includes a browser software program to provide communications and display support. The browser software program is executed in only one instance to provide the support for the plurality of display areas. The display controls also include a designator control operable by a user to designate the number of the non-overlapping display areas to be displayed. The display controls also include a drag and drop control for universal reference locators.

13 Claims, 20 Drawing Sheets

U.S. PATENT DOCUMENTS

| | | |
|---|---|---|
| 6,219,679 B1 | 4/2001 | Brisebois et al. |
| 6,237,030 B1 | 5/2001 | Adams et al. |
| 6,252,594 B1 | 6/2001 | Xia et al. |
| 6,275,225 B1 | 8/2001 | Rangarajan et al. |
| 6,289,361 B1 | 9/2001 | Uchida |
| 6,313,854 B1 | 11/2001 | Gibson |
| 6,344,865 B1 | 2/2002 | Matthews, III et al. |
| 6,832,355 B1 | 12/2004 | Duperrouzel et al. |

OTHER PUBLICATIONS

Andrews, www.internetnews.com/bus-news/article.php/47791, "KatieSoft Scroll Supercharges Top Browsers,", 2 pages, Jul. 20, 1998.

Press Release, www.jconsult.com/Newsroom/98news/k71698n.htm, "KatieSoft Scroll 3.0 Leverages Power of Netscape Communicator 4.5 and Creates a Dynamic New Internet Interface," 1 page, Jul. 16, 1998.

\* cited by examiner

WEB PAGE DISPLAY SYSTEM

CROSS-REFERENCE TO RELATED APPLICATION

This is a continuation of U.S. application Ser. No. 10/985,529, filed Nov. 9, 2004, and published as U.S. 2005 0 086 597 A1, which is a continuation of U.S. application Ser. No. 09/124,468, filed Jul. 28, 1998, now U.S. Pat. No. 6,832,355, all of which are hereby incorporated by reference.

TECHNICAL FIELD

This invention relates to display systems for displaying electronic data, and more particularly to network-based web page display systems.

BACKGROUND OF THE INVENTION

Communication technologies continue to provide more capabilities, increase in capacity, and expand throughout the world. An international communication network known as the Internet is increasing in both numbers of users and capacity at nearly an exponential rate. The Internet is accessible by the general public in a large number of places around the world. Users of the Internet have a universe of network-accessible information.

Along with the Internet, there is growth of other private, government, and commercial networks reserved for authorized users. For instance, some commercial networks are reserved for authorized users such as employees, suppliers, or customers of a company. These other networks may share communication links used by the Internet or they may not.

Regardless of whether the network is the Internet or other networks, users are able to obtain network-accessible information by using web page display systems also known as network browsers. These web page display systems download web pages containing desired information from the Internet and various private networks. A web page is displayed through the use of the web page display systems on display screens of user terminals which include terminals, workstation monitors, television sets, and other display devices.

A web page provides many different formats of information including text, graphics, video, sound, and any other format of electronic data. One or more web pages are stored at web sites having web page servers that are connected to the network and allow access to the web pages by users of the particular network. The type of information at each particular web site varies from news, cultural, sports, commerce, governmental, corporate, investment, and other related topics. The private networks usually are more limited in the type of information provided compared to the Internet.

Each web page also may contain numerous hypertext links which link one web page to many other web pages of related information. As network technology has progressed, everything from web page-based e-mail services, groceries, bookstores, and brokers are competing for the attention of web page users. Web page users have voracious appetites for technology, information, and commerce. Skilled experts have been replaced by skilled masses capable of dealing with more web pages and a vast variety of scenarios and applications. The majority of users remain unable to exploit the opportunities and efficiency of the networks due to the simplicity and limitations of their web page browsers. These web page browsers are interfaces which display the web pages on display screens of the user terminals.

Thus, it can be appreciated that there is a significant need for a system and method that would enhance web browser capability and reduce the amount of time that a web page user requires to manage a web page browser.

SUMMARY OF THE INVENTION

The present invention resides in a display system for displaying web pages accessible on a network. The display system includes a computer system configured to send requests for web pages via the network to web page sites. The computer system also receives web pages via the network from web page sites. The display system further includes a display having display controls and a plurality of non-overlapping display areas having adjustable sizes. The plurality of non-overlapping display areas have a collective size equal to the sum of the non-overlapping display areas. Each non-overlapping display area has independent display area controls and is configured to independently display a web page received by the computer. A sizing control operable by a user is used to adjust the sizes of the display areas simultaneously with one control action while maintaining the collective size of the non-overlapping display areas. In one aspect of the invention, the computer system executes only one instance of a software program for sending the web page requests and receiving and displaying the requested web pages.

In one embodiment, the display system includes display controls that activate a group of the display areas to display a web page from a list of web page sites selected from a plurality of lists of web page sites. Each list of web page sites has a sequential order and has a number of web page sites not dependent on how many display areas are displayed. The computer stores the plurality of lists of web page sites.

In another embodiment, the sizing control includes a graphical object on the display and the one control action is movement of the graphical object by the user using an input device. The display controls include a designator control operable by a user to designate the number of non-overlapping display areas. In a further embodiment, the display controls include a drag and drop control configured to drag and drop a uniform reference locator from a first display area into a second display area. The second display area is configured to display a web page associated with a uniform reference locator.

Other features and advantages from the invention will become apparent from the following detailed description, taken in conjunction with the accompanying drawings.

DETAILED DESCRIPTION OF THE INVENTION

Figure 1:
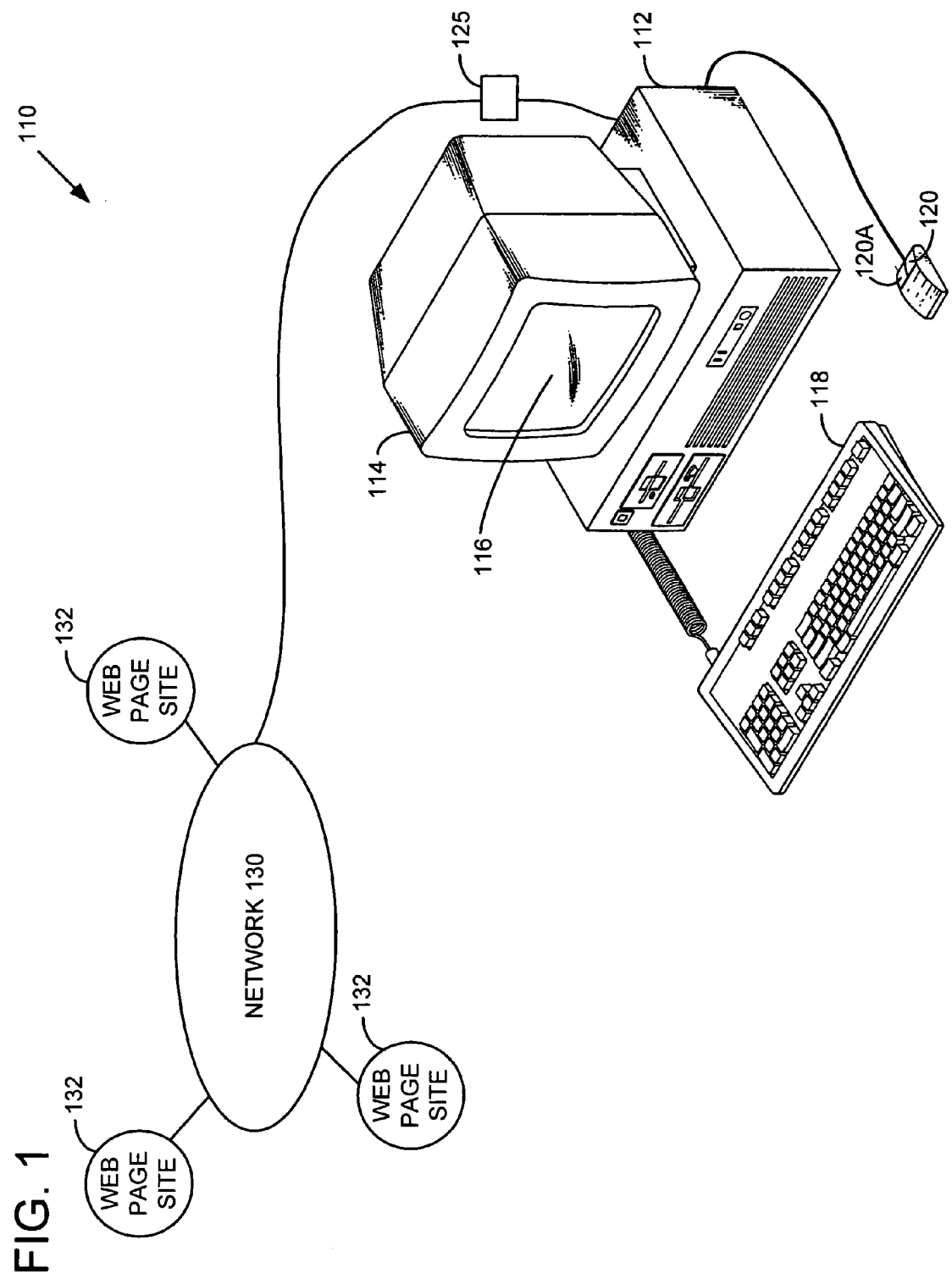
FIG. 1 illustrates a workstation terminal used to execute and display an embodiment of a web page display system according to the present invention.

Displaying multiple web pages simultaneously on a display screen facilitates both navigation of web page-based networks and analysis of web page-based information by a web page user. It is helpful to have more than one web page displayed at a time in navigating because web page users can find themselves somewhat lost after following a long chain of hypertext links. For instance, in displaying a series of webpages which follow a chain of hyper-text links, a user may want to display a particular web page while simultaneously displaying one or more additional web pages from the chain of hyper-text links. The display of the particular web page helps the user keep a general perspective in mind while the user examines more detail in additional one or more displayed web pages.

Multiple web pages displayed concurrently can also help in research involving comparisons such as in shopping at the consumer level. Comparisons made with multiple displayed web pages is also done for instance at the corporate level for acquisition and project management. Displaying multiple web pages simultaneously can also help a user speed up searches. In this case a user views and studies one web page while performing a search through another web page if both are displayed simultaneously.

Web page users typically launch a web page browser, such as Microsoft Internet Explorer, and navigate to the desired web page. Navigational tools, such as a back arrow and a forward arrow, allow the user to move back and forth to previously visited web pages. However, this approach does not permit the user to view multiple web pages simultaneously. One solution to the problem of displaying only one web page at a time is to run multiple copies of web page browsers on the display screens of their user terminals. However, running multiple copies of web page browsers simultaneously can exact costs in both time for the user to configure the display screen and resources required by the user terminal. Much time is spent positioning and resizing the web pages on the display screens so that each web page can be properly viewed. Also, multiple executed copies require excessive amounts of user terminal resources, such as system memory and communication bandwidth.

The present invention is directed to a system and method for a web page display system. Multiple web pages are displayed simultaneously with a reduction of time and effort required by the user to position, size, and configure the web pages compared to prior art techniques. Also multiple web pages are displayed with less system resources required by the user terminal compared to prior art techniques. These and other advantages will become apparent in the following detailed description. In the following description, numerous specific details are provided, such as specific screen displays, placement and shapes of controls, and ordering of menu selections. One skilled in the relevant art, however, will recognize that the invention can be practiced without one or more of the specific details, or with other symbols, methods, etc. In other instances, well-known structures or operations are not shown or described in detail to avoid obscuring the description of the embodiments.

A computer workstation user terminal 110 using an embodiment of the web page display system of the present invention is illustrated in FIG. 1. The computer workstation user terminal 110 includes a computer 112, a monitor 114 including a display screen 116, a keyboard 118, and a mouse input device 120 with a mouse button 120a. The computer workstation user terminal 110 accesses a network 130 using conventional networking technology in order to download web pages for display. For example, the computer 112 can include a communication controller 125 for accessing the network 130. The communication controller 125 may be a conventional modem using standard analog telephone lines, ISDN, T1, or other such communication links. The computer 112 can also access the network via a network controller if the communication controller 125 is a network interface. Other conventional communication controllers may also be readily used to implement the present invention. The operation of these various devices to access the network 130 is well known in the art so it does not need to be explained in detail. The network 110 can be any network that allows access to web page sites 132. The network 130 could be, for example, the Internet, a corporate network, a government network, a private network, a commercial network, or other such network.

Once the computer workstation user terminal 110 downloads a web page from a web page site 132, the web page is displayed on display 116. The embodiment of the present invention allows multiple web pages to be simultaneously displayed such that the display screen 116 of the computer workstation user terminal 110 displays multiple web pages that have been downloaded from multiple web page sites 132 off of the network 130. The web page sites 132 can be interrelated of completely independent. The multiple web pages are displayed and communication support is provided for communicating between the web page sites 132 and the computer workstation user terminal 110 by executing only one instance of browser software on the computer workstation terminal 110.

Figure 2:
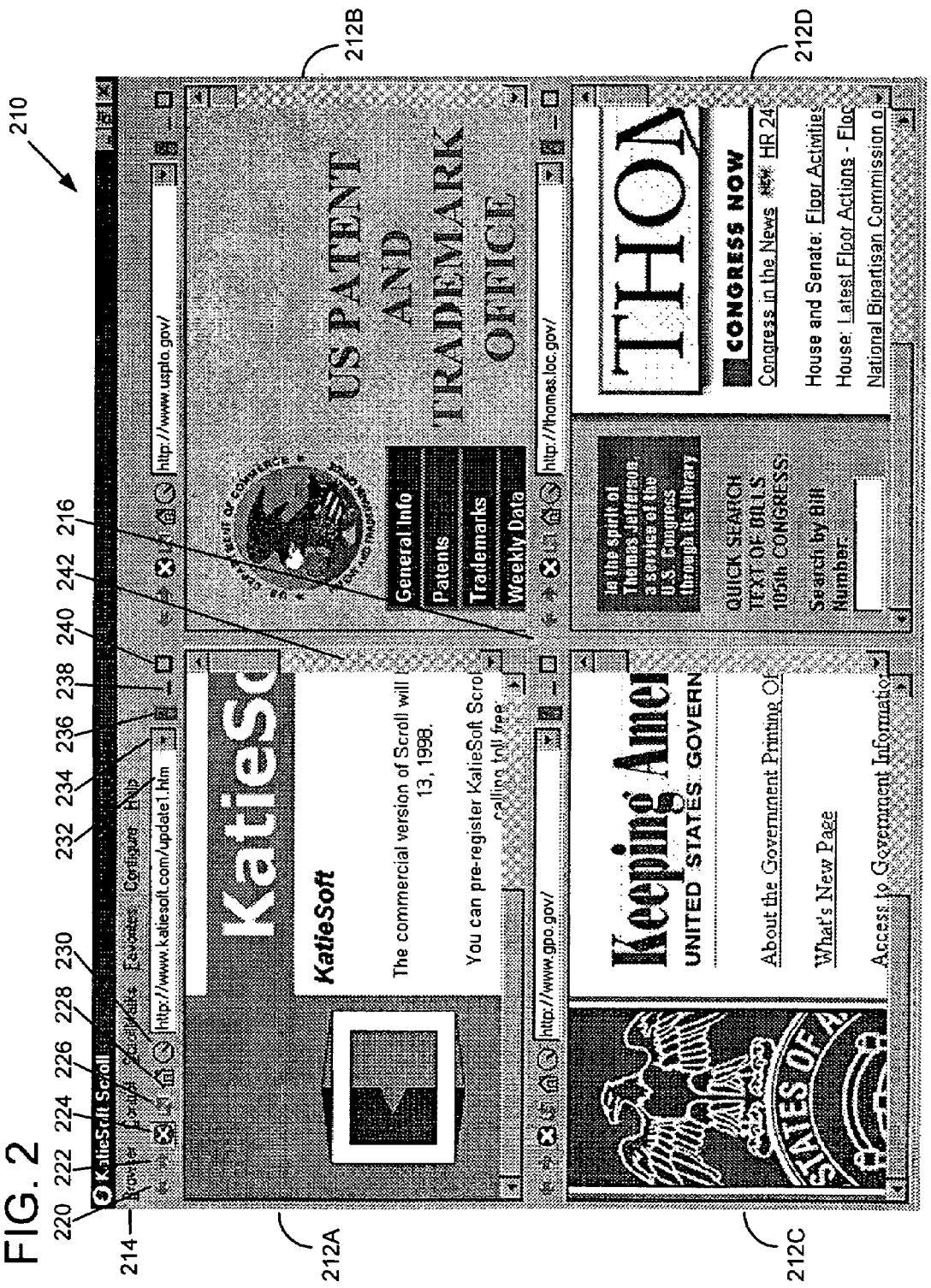
FIG. 2 is a screen display of the web page display system of FIG. 1 used to display four web pages.

FIG. 2 illustrates a screen display 210 of the web page display system embodiment wherein four non-overlapping web pages are simultaneously displayed. The particular four web pages displayed in FIG. 2 and the other particular web pages displayed in the other figures are for illustration purposes. The embodiment of the present invention is not limited to displaying only these particular web pages shown in the figures. Instead, the embodiment of the present invention displays any web page accessible through a network.

The four web page display 210 includes four display panes 212a, 212b, 212c, and 212d. Each display pane 212 is a display area that frames and provides controls for a particular web page being displayed within the display pane 212. The descriptions of the individual controls for the display pane 212a are also applicable for the individual controls for the other display panes 212b, 212c, and 212d.

Multiple display panes 212a-d are implemented with only one instance of most executable portions of the associated browser software being executed by associating an individual copy of a web browser control file with each active display pane 212. In the case of Microsoft Internet Explorer 4.0, the depicted embodiment uses the Microsoft Internet Explorer web browser engine to display each web page in each display pane 212. An individual copy of a web browser control computer file labeled "shdocvw.dll" is associated with each display pane 212 by parenting, as known in the art, each individual web browser control into an individual picture box associated with each display pane 212. When a particular display pane 212 is revised, its associated picture box is revised which then through the associated parenting causes the web browser to be appropriately revised. For the case of the four-web page display 210, four "shdocvw.dll" files are thus used in the control of the four display panes 212. However, only one copy of other computer files associated with execution are used which greatly reduces required computer memory to implement multiple display panes 212.

In an alternative embodiment, a Netscape Navigator web browser engine is used instead of the Microsoft Internet Explorer web browser engine. When the Netscape Navigator web browser engine is used, an entire copy of the web browser engine must be executed for each display pane 212 being displayed. This is because currently the Netscape Navigator web browser engine does not provide a web browser control file similar to that found in the Microsoft Internet Explorer web browser engine. As other web browser engines provide similar web browser control files, the depicted embodiment will utilize them for similar reductions in memory requirements. The use of web browser engines by the depicted embodiment was described in particular with reference to web browser engines that operate under particular computer operating systems. However, the present invention is not limited to particular web browser engines or particular computer operating systems but is intended to be used with all web browser engines and computer operating systems.

A back arrow control 220 and a forward arrow control 222 of the display pane 212a are both related to a sequence in which a series of web pages have been initially displayed on display pane 212a. The related sequence typically ends with a web page that has been most recently downloaded from the network 130 (see FIG. 1) and begins with a web page least recently downloaded from the network. Each time the back arrow control 220 is selected the displayed pane 212a will display the next web page that is closer to the beginning of the related sequence than the web page displayed at the time of activation. Each time the forward arrow control 222 is selected, the display pane 212a will display the next web page that is closer to the end of the related sequence than the web page displayed at the time of activation.

A stop control 224 of the display pane 212a is used to terminate any communication currently in progress with a web site from which the computer workstation user terminal 110 (see FIG. 1) is downloading a web page. A refresh control 226 of the display pane 212a repeats a download of the web page currently displayed on the display pane 212a A home control 228 of the display page 212a is used to access a default web page that has been designated as a home web page. Home web pages will be discussed further below.

A search control 230 of the display page 212a accesses a web page that has been designated as a search web page. Generally, search web pages contain further controls related to searching for specific web pages containing desired information. Designation of search web pages are discussed further below. A uniform resource locator (URL) 232 of the display pane 212a displays a URL of a current web page being displayed. The URL may be thought of as the "address" of the web site. Although the illustrated embodiment uses URLs, the present invention is not limited to URLs. Any string expression that can represent a web page resource on a network may be satisfactorily used by the present invention. An access control 234 of the display pane 212a, when selected, causes a pop-down list of URLs to be shown on the display 116. The user can select the URL of a desired web page in a conventional fashion. As an option, this list may be predefined as a designated group of URLs as discussed further below.

A status indicator 236 of the display page 212a indicates whether the web page display system is currently in the process of downloading a web page. Downloading is indicated by a red dot being illuminated, whereas a green dot being illuminated indicates no communication is currently in progress.

A minimize control 238 of the display pane 212a is integrated with an operating system of the computer 112 hosting the web page display system in the present embodiment of the invention. The minimize control 238 is used when a user desires the display 116 to display something other than the web pace display system of the present embodiment of the invention. A maximize control 240 of the display pane 212a is similar to the minimize control 238 except the maximize control is used when a user desires the entire display 116 to display the web page corresponding to the display pane 212 whose maximize control is activated. A scroll control 242 of the display pane 212a controls the position of the web page being displayed in the display pane 212a. When web pages are larger than the display pane 212a, the scroll control 242 operates in a known manner to permit the user to scroll through an entire web page.

The four web page display 210 also includes pop-down menu controls 214 and a sizing control 216. While the controls for each display pane 212 affect only that display pane, the pop-down menu controls 214 are operable to control all four display panes 212a, 212b, 212c, and 212d simultaneously. Certain aspects of the pop-down menu controls 214 can be inactivated in a locked mode so that one or more of display panes 212 are not affected by certain controls of the pop-down menu controls 214. This will be described in further detail below. The present embodiment of the invention is described in terms of a maximum of four display panes 212 displaying a maximum of four web pages. However, the present invention is not limited to displaying four web pages on four display panes, but can conveniently display any number of web pages on any number of display panes.

The sizing control 216 is operable to control the sizing of all four display panes 212 simultaneously. The sizing control 216 includes a graphical object displayed on the display screen 116 illustrated in FIG. 2 as a dot. The sizing control 216 is positioned by a user typically using the mouse input device 120. However, other computer control devices, such as a trackball, joystick, and the like, may also be used. The sizing control 216 is positioned within the area of the four web page display 210. The web page display system of the four web page display 210 maintains the four display panes 212 so that the intersection of their common corners is always at the position of the sizing control 216. The four display panes 212 may be resized when the sizing control 216 is repositioned using, by way of example, "drag and drop" control. In this embodiment, the user manipulates the mouse input device 120 to position a cursor (not shown) on the sizing control, activates a mouse button 120a and keeps the mouse button activated while moving the cursor to a desired new location. Once the cursor is at the desired location, the user releases the mouse button to automatically activate the resizing process. Thus, if the sizing control 216 is moved to a different position, the size of the display panes 212 will be automatically adjusted accordingly so that the intersection of the common corners of the display panes 212 will continue to be in the position of the sizing control 216. This can be seen in FIG. 3 wherein the sizing control 216 has been moved downward and to the left portion of the four web page display 210 as compared to the position of the sizing control 216 in FIG. 2. As sizing occurs the total combined display area of the display panes 212 remains generally constant.

Figure 3:
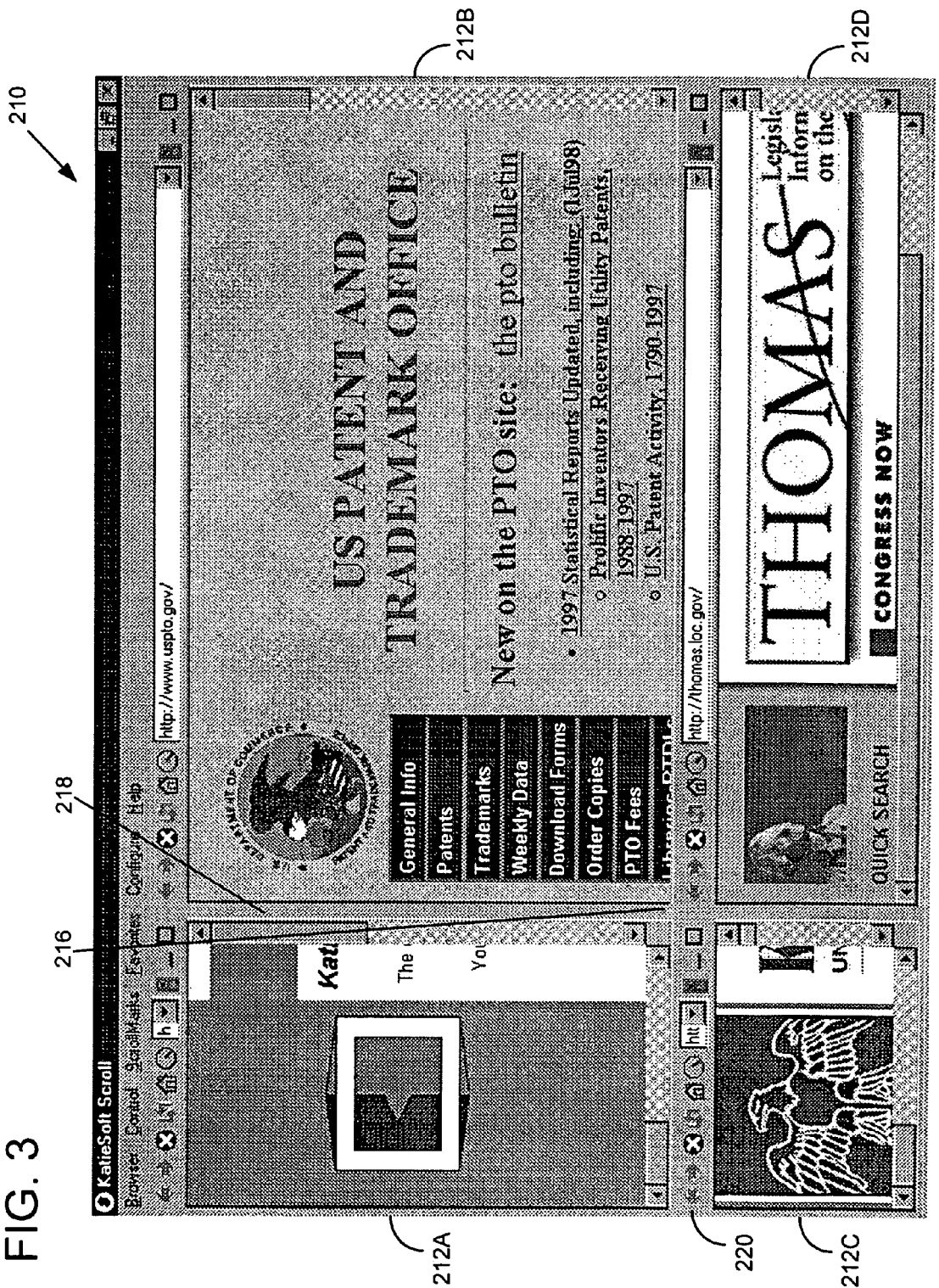
FIG. 3 is a screen display of the web page display system of FIG. 2 showing a result of sizing control.

For the process of resizing, each active display pane 212 must be subject to a standard "move" command from a windows operating system environment such as Windows 95, 98, NT, or other windows environments. Since, typically, windows operating system environments cannot process four move commands simultaneously, one of the active display panes 212 is first subject to the "move" command. In the depicted embodiment, display pane 212a is first subject to the "move" command. When the sizing control 216 is repositioned by a user using the mouse input device 120, the display pane 212a is subject to the windows environment "move" command, which results in display pane 212a being revised. In the depicted embodiment, if the sizing control 216 is moved, for example, to a coordinate position of 150 pixels from the inside edge of the left border and 600 pixels from the inside edge of the top border of the four web page display 210, as shown in FIG. 3, the width and height of display pane 212a will be 150 and 600, respectively.

The remaining display panes 212b-212d are automatically resized using additional "move" commands. For example, the display pane 212b will be automatically resized using the windows environment "move" command with the width of display pane 212b being the distance from left border inside edge to right border inside edge of the four web page display 210 less the width of display pane 212a and less the width of an interior vertical border dividing display panes 212a and 212b. The height of display pane 212b will be equal to the height of display pane 212a as shown in FIG. 3. Once both the widths and heights of display panes 212a and 212b are determined, the width and height of display pane 212c is determined and display pane 212c is subjected to the windows environment "move" command in a similar manner as described for display pane 212b except a distance from top border inside edge to bottom border inside edge of the four web page display 210 and height of an interior horizontal border 220 between display panes 212a and 212c are used in calculations. Finally, once the widths and heights are determined for display panes 212a-c, the width and height for display pane 212d is determined and display pane 212d is subjected to the windows environment "move" command in a similar manner as described for display panes 212b and 212c. An order of calculations and "move" commands similar to that described for the four web page display 210 are performed for resizing of web page displays have greater or fewer number of display panes 212 as the four web page display only tailored to the number of display panes 212 of the web page display involved. Also, if the display panes 212 are positioned in the web page display in a different arrangement than described for FIG. 3, the calculations would be adjusted accordingly as would be understood by one of ordinary skill in the art.

Figure 6:
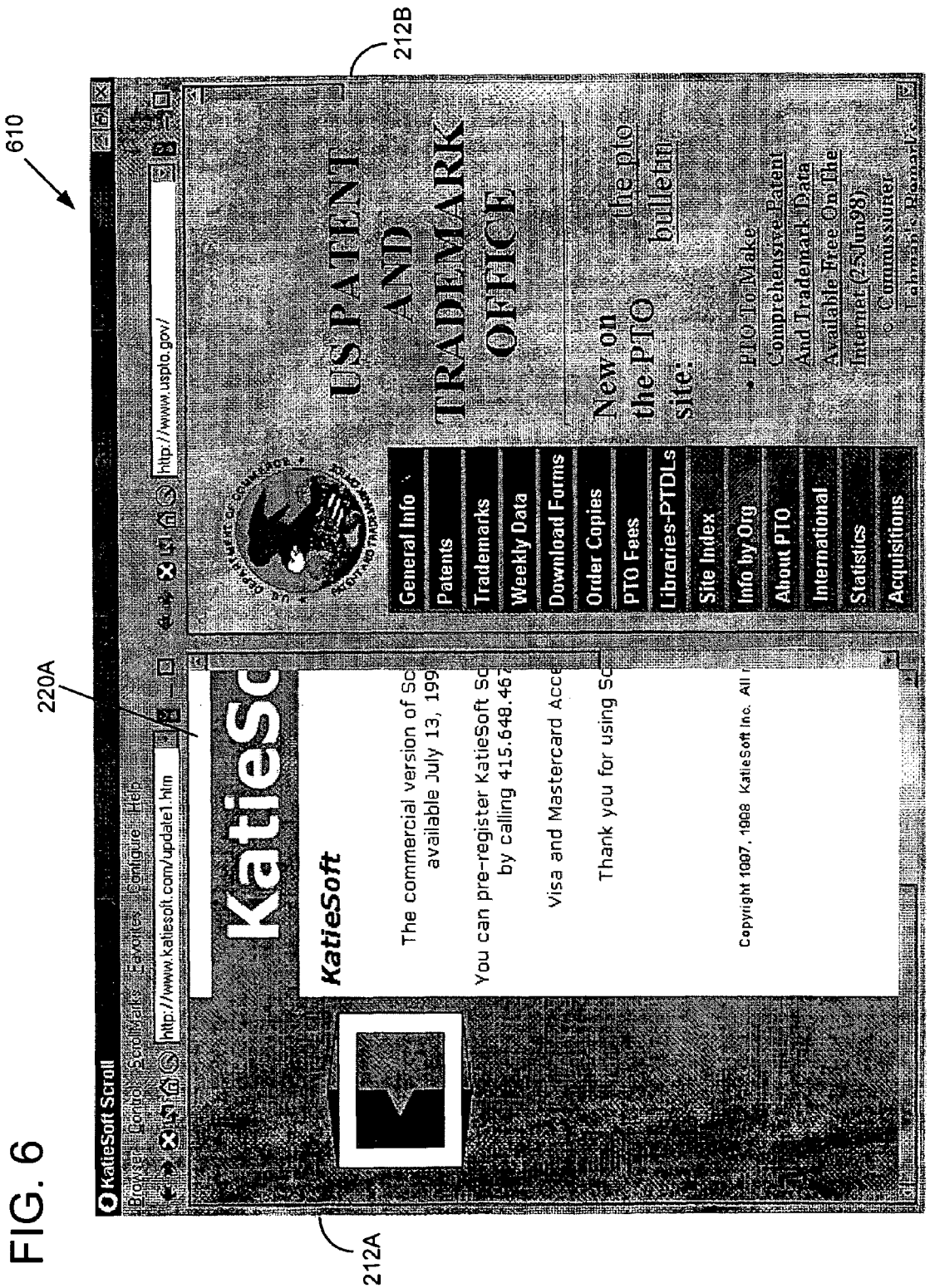
FIG. 6 is a screen display of the web page display system of FIG. 1 used to display two web pages.

Another consideration taken into account is the situation in which a user moves the sizing control 216 near or off the edge of the display 116. For this case differences are determined in the size calculations in conjunction with use of an absolute value function to avoid error conditions in executing computer code as is typically used in the art. Resizing display panes 212a and 212b of the two web page display 610 of FIG. 6 is dependent upon the configuration settings 1910 shown in FIG. 19 which dictate the orientation of the two display panes 212a and 212b. If the two page web display 610 is configured to display display panes 212a and 212b vertically or horizontally, the width or height respectively of the display panes 212a and 212b will be affected.

Figure 4:
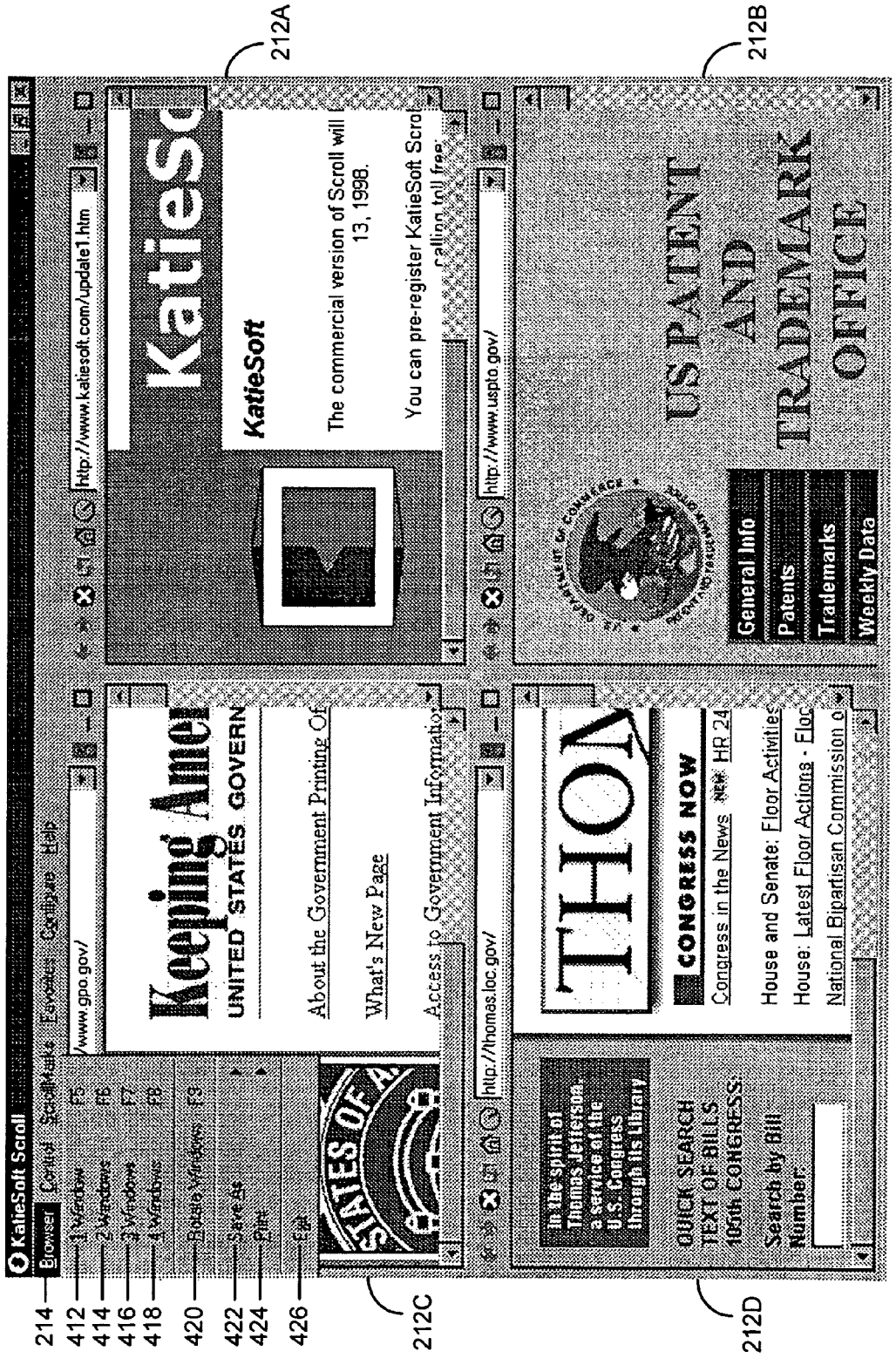
FIG. 4 is a screen display of the web page display system of FIG. 2 showing a main Browser menu.

A screen display of the menu selections of the Browser menu 214 of the four web page display 110 is shown in FIG. 4. The menu selections of the Browser menu 214 include One Window 412, Two Windows 414, Three Windows 416, and Four Windows 418. These Browser menu 214 selections 412-418 and the keyboard function keys F5 through F8 act as a designator control whereby selection results in one to four display panes 212 being displayed. The display pane 212a has the highest priority and will always be displayed. The display pane 212d has the lowest priority and will only be displayed if the Four Windows menu selection 418 or the F8 key is selected. Display pane 212b will be selected if one of the Two Windows 414, Three Windows 416, or Four Windows 418 of the Browser menu 214 selections is selected or one of the F6 through F8 keys is selected. Display pane 212c will be displayed if one of the Three Windows 416 or Four Windows 418 of the Browser menu 214 selections is selected or one of the F7 or F8 keys.

The selection of a Rotate Windows menu selection 420 results in the display panes 212 being rotated in position relative to one another. The display panes 212, however, stay in their non-overlapping position within the four page display 210 as can be seen by comparing FIGS. 4 and 2. FIG. 4 is the result of one execution of the Rotate Windows selection 420. As can be seen by comparing FIGS. 2 and 4, after the rotation was completed, all the display panes 212 rotated one display pane in the clockwise direction. A Save As selection 422 and a Print selection 424 will be further discussed below. An Exit selection 426 when selected deactivates the web page display system from its current execution on the computer workstation user terminal 110. In one embodiment, display panes 212 are also automatically resized to a default size when the Rotate Windows menu selection 420 is selected or when one of the number of Windows menu selections 412-418 or one of keys F5 through F8 is selected.

Figure 5:
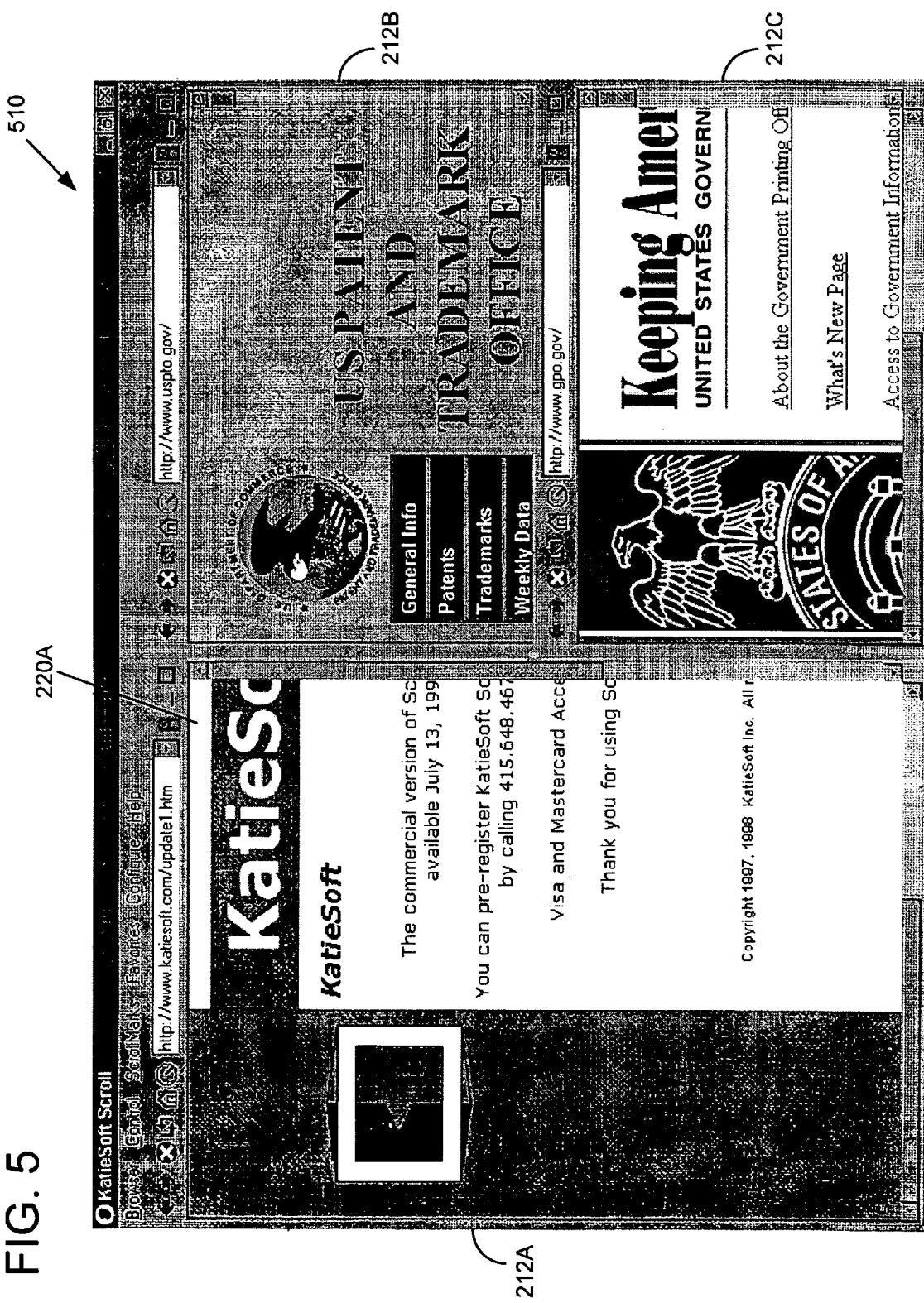
FIG. 5 is a screen display of the web page display system of FIG. 1 sed to display three web pages.

When the Three Windows 416 selection of Browser menu 214 is selected, a three web page display 510 is displayed as shown in FIG. 5. The difference between the four web page display 210 and the three web page display 510 is that the fourth display pane 212d is no longer displayed. The pop-down menu controls 214 and the sizing control 216 remains in the three web page display 510. The sizing control 216 for the three web page display 510 is always positioned at the intersection of the common corners of the two display panes 212b and 212c and the common edge of the display pane 212a as illustrated in FIG. 5. The sizing control 216 operates in the manner described above to automatically resize the display panes 212.

A two web page display 610 has only two display panes 212a and 212b as shown in FIG. 6. Again, the pop-down menu controls 214 and the sizing control 216 remain in the two web page display 610 and operate in the manner described above. The sizing control 216 for the two web page display 610 is always positioned in the middle of the common-edge of display panes 212a and 212b, shown in FIG. 6.

Figure 7:
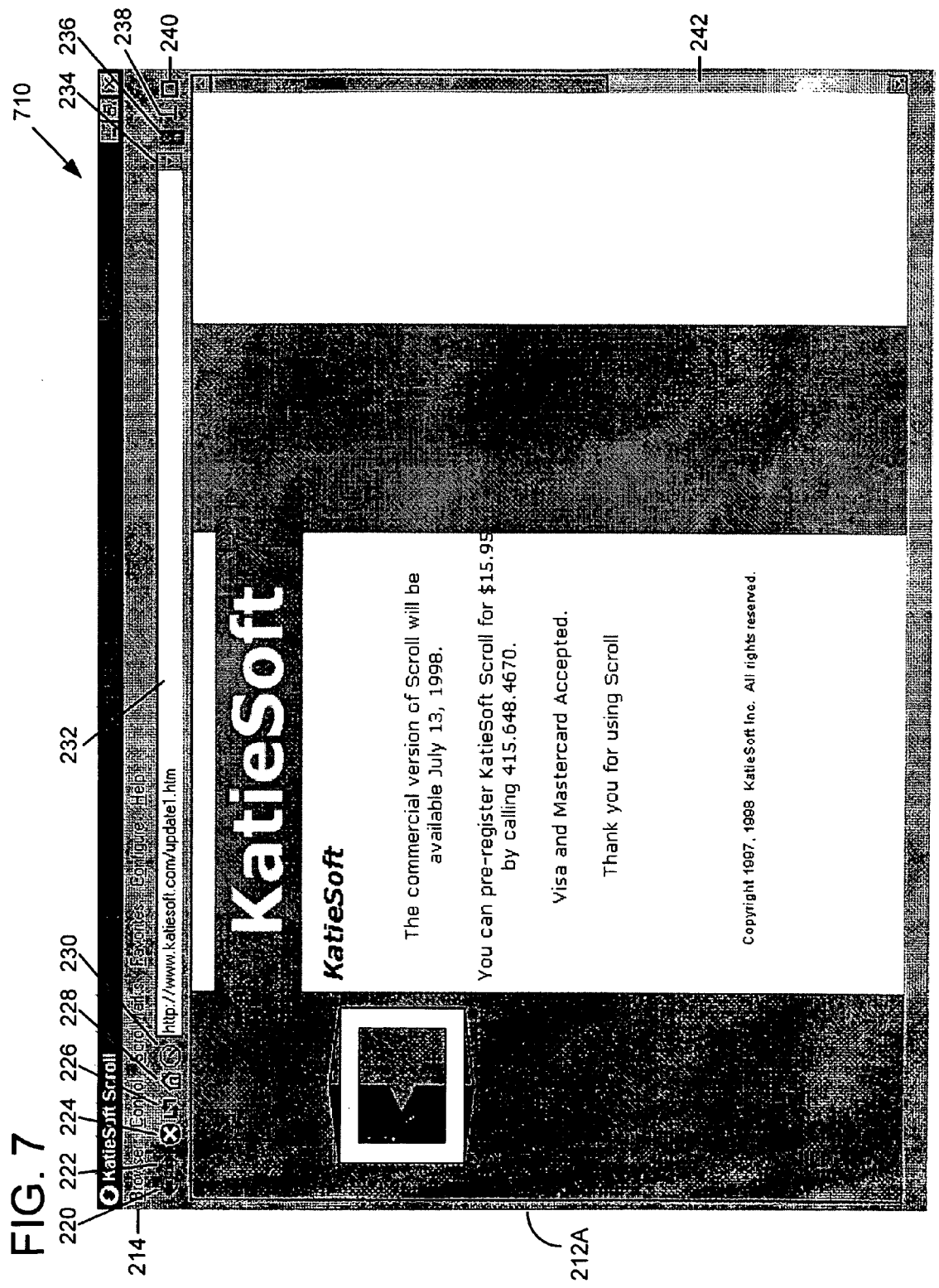
FIG. 7 is a screen display of the web page display system of FIG. 1 used to display one web page.

A one web page display 220 has only the display pane 212a displayed as shown in FIG. 7. As with the other web page displays, the pop-down menu control 214 remains. However, the sizing control 216 is no longer needed and is therefore not available.

Figure 8:
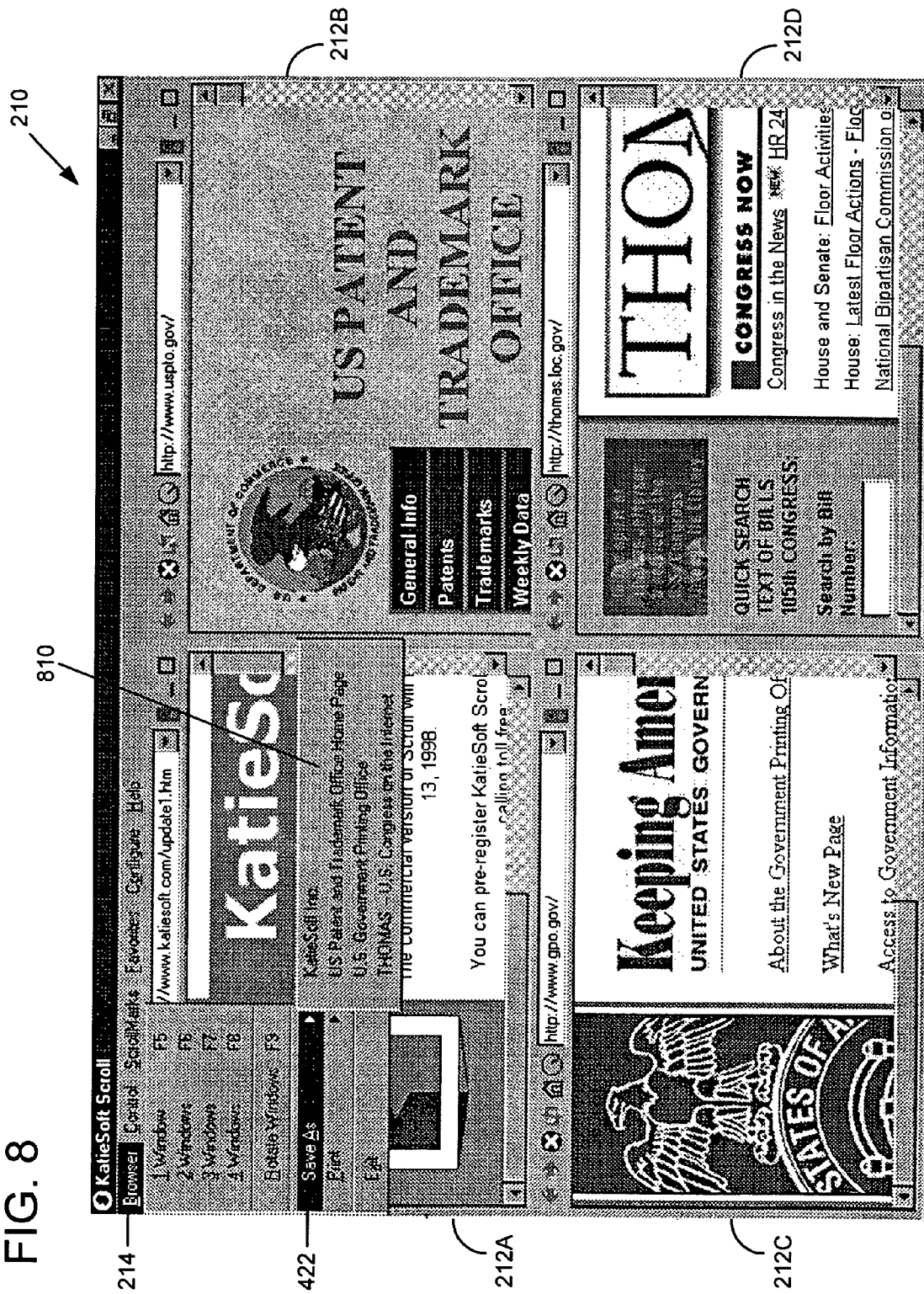
FIG. 8 is a screen display of the web page display system of FIG. 2 used to display and select a web page to be saved.

Activation of the Save As menu selection 422 of the Browser menu control 214 allows the user to save any web page currently being displayed in one of the active display panes 212, as illustrated by a screen display of FIG. 8. The current web page is saved in Hypertext. Markup Language (HTML) format on to the computer workstation user terminal 110. In the case illustrated by FIG. 8, four display panes are selected in the four web page display 210. Therefore, the Save As menu selection 422 allows selection of any one or more of the four web pages currently being displayed. The web page being displayed in display pane 212a can be saved by selecting the topmost menu selection of the Save As menu selection 422. The web page being displayed in display pane 212b can be saved by selecting the second topmost, menu selection of the Save As menu selection 422. The web page being displayed in display pane 212c can be saved by selecting the third topmost Save As menu selection 422. The web page being displayed in display pane 212d can be saved by selecting the bottommost Save As menu selection 422.

Figure 9:
FIG. 9 is a screen display of the web page display system of FIG. 2 used to display and select a web page to be printed.

The Save As menu selection 422 has been described specifically related to the four web page display 210. However, if fewer panes have been selected, such as in the three web page display 510, the two web page display 610, or the one web page display 220, the procedure to save a web page currently being displayed in one of the display panes is the same except that the Save As menu selection 422 would have fewer menu selections according to the number of display panes selected. The operation of a Print menu selection 422 of the Browser menu control 214, shown in FIG. 9, is similar to the operation of the Save As menu selection 422 except that in this case the selected web page is printed instead of being saved in HTML format.

Figure 10:
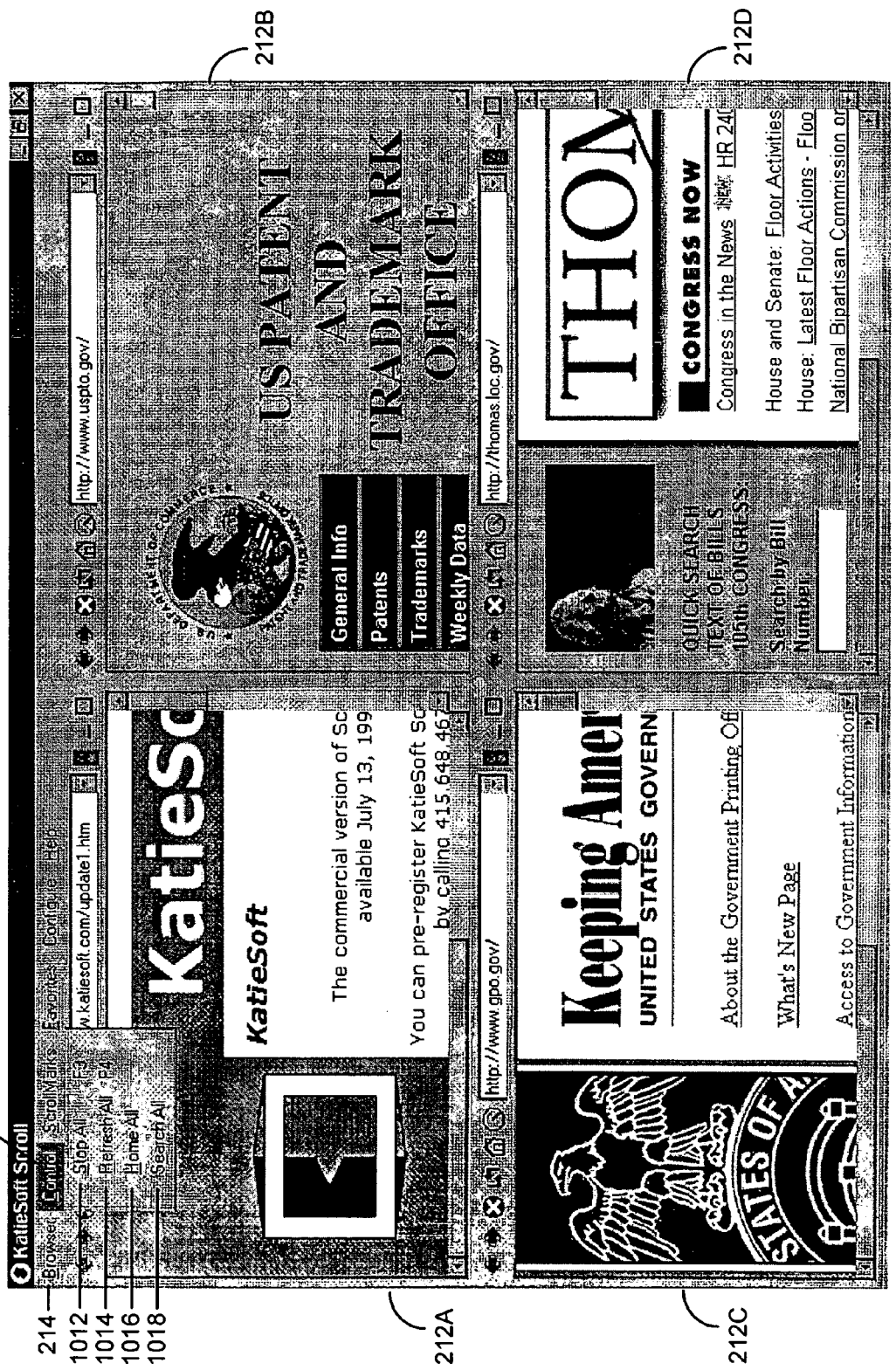
FIG. 10 is a screen display of the web page display system of FIG. 2 used to display and select from a main Control menu.

The Control menu 1010 of the pop-down menu controls 214 includes controls for all selected display panes 212. For the case of the four web page display 210 illustrated in FIG. 10, the Control Menu 1010 includes-controls for display panes 212a, 212b, 212c, and 212d. The Control menu 1010 includes a Stop All selection 1012. The Stop All selection 1012 has the same effect when selected as the stop control 224 of the display pane 212a of FIG. 2 except that the stop control 224 is for an individual display pane, whereas the Stop All selection 1012 affects all display panes 212 currently selected. In the case of FIG. 10, where the four web page display 210 is shown, the Stop All selection 1012 would terminate any communication currently occurring with any of the web sites shown in the four display panes 212. For the case of the three web page display 510, two web page display 610, and the one web page display 220, the Control Menu 1010 also includes a Stop All selection 1012 that operates in the same manner except that the number of web pages affected is fewer according to the number of display panes 212 being selected.

The Control menu 1010 of the pop-down menu controls 214 also has a Refresh All selection 1014. The Refresh All selection 1014 is the same as the refresh control 226 of display pane 212a shown in FIG. 2 except that the refresh control 226 controls refresh of only the display pane 212a, whereas the Refresh All selection 1014 activates refresh of all the active display panes. For the case of the four web page display 210 of FIG. 10, activation of the Refresh All selection 214 repeats the download of each of the web pages currently being displayed in the four display panes 212. For the case of the three web page display 510, two web page display 610, and the one web page display 220, the Refresh All selection 1014 operates the same except the number of web pages being refreshed is fewer according to the number of selected display panes.

The Control menu 1010 also has a Home All selection 1016 and a Search All selection 1018. When a user selects either the Home All selection 1016 or the Search All selection 1018, all currently selected display panes 212 download predetermined web pages. For the case illustrated by FIG. 10 showing the four web page display 210, four display panes 212 download four predetermined web pages. For the case of the three web page display 510, the two web page display 610, and the one web page 220, three, two, and one predetermined web pages, respectively, are downloaded. Each display pane 212 has a specific web page designated as a home web page and a specific web page designated as a search web page. The home web page and the search web page for a particular display pane can be different from one another, and can be different from other home and search web pages for other display panes. Designation of the home and search web pages are further discussed below.

Figure 11:
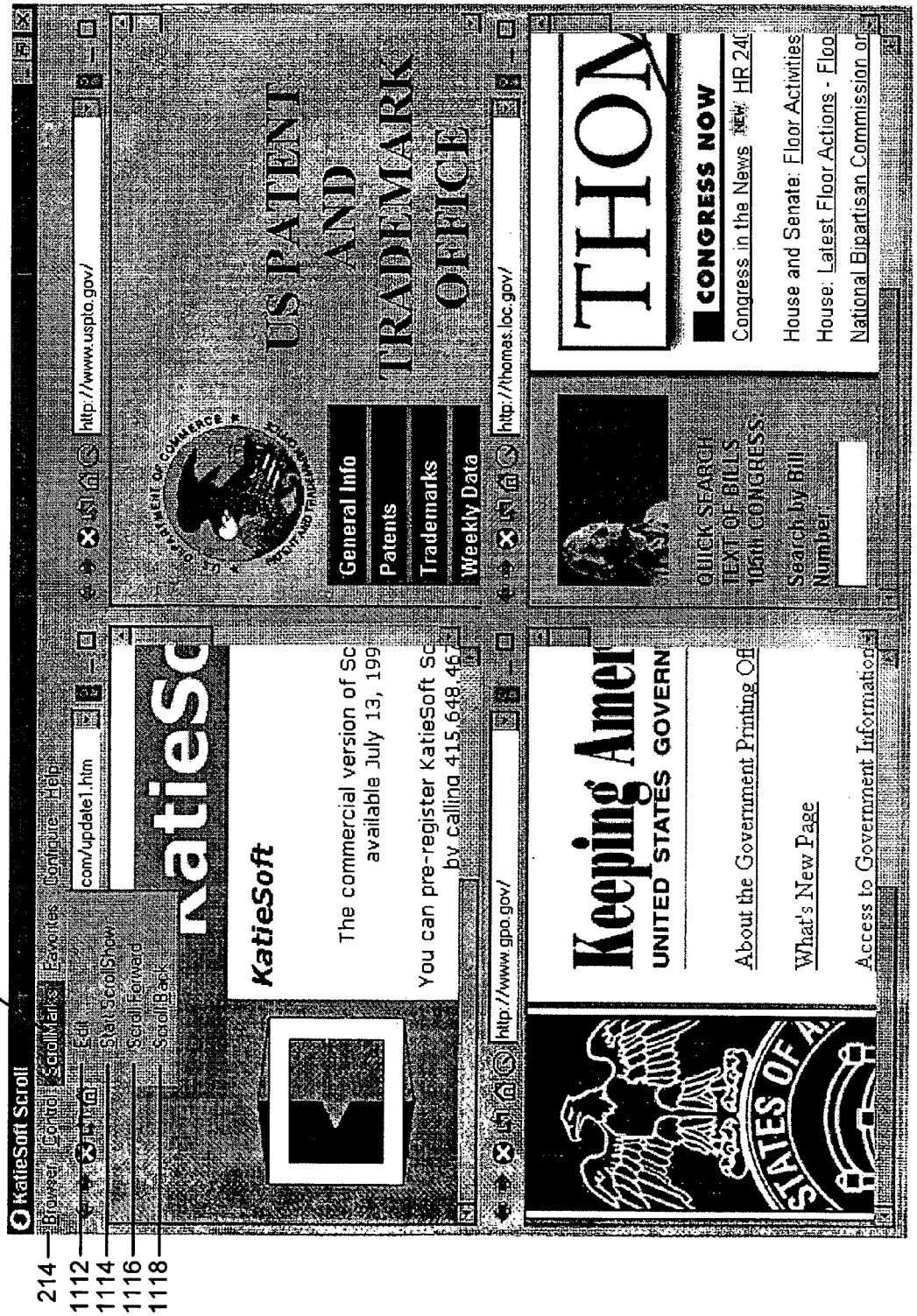
FIG. 11 is a screen display of the web page display system of FIG. 2 used to display and select from a main ScrollMarks menu.

A ScrollMarks menu 1110 of the pop-down menu controls 214 as part of the four web page display 210 is illustrated in FIG. 11. The ScrollMarks menu 1110 includes an Edit selection 1112. The Edit selection 1112 allows a user to edit a list of web page URLs that serve as addresses for particular web pages. Upon selection of a StartScrollShow selection 1114 of the ScrollMarks menu 1110, the four web page display 210 displays the first four web pages on the list of web page URLs. Selection of a Scroll Forward selection 1116 and a Scroll Back selection 1118 of the ScrollMarks menu 1110 allows a user to scroll forward and backward, respectively, through the list of web page URLs to display other web pages that are on the list. In the present embodiment of the invention, scrolling is done by one, two, three, or four web pages at a time. For example, if scrolling is done by two web pages at a time for the four web page display 210, two previously displayed web pages are no longer displayed and two new web pages are shifted to the display panes 212 which had been displaying the web pages no longer displayed, and subsequent two or previous two web pages on the list are displayed in the remaining display panes 212. Thus, the web pages of display panes 212a and 212b are no longer displayed and the web pages of display panes 212c and 212d are shifted into display panes 212a and 212b, respectively. The next two new web pages from the list of web page URLs are shifted into the display panes-212c and 212d, respectively. A similar shifting process occurs when scrolling is done by one, three or four web pages at a time.

Figure 12:
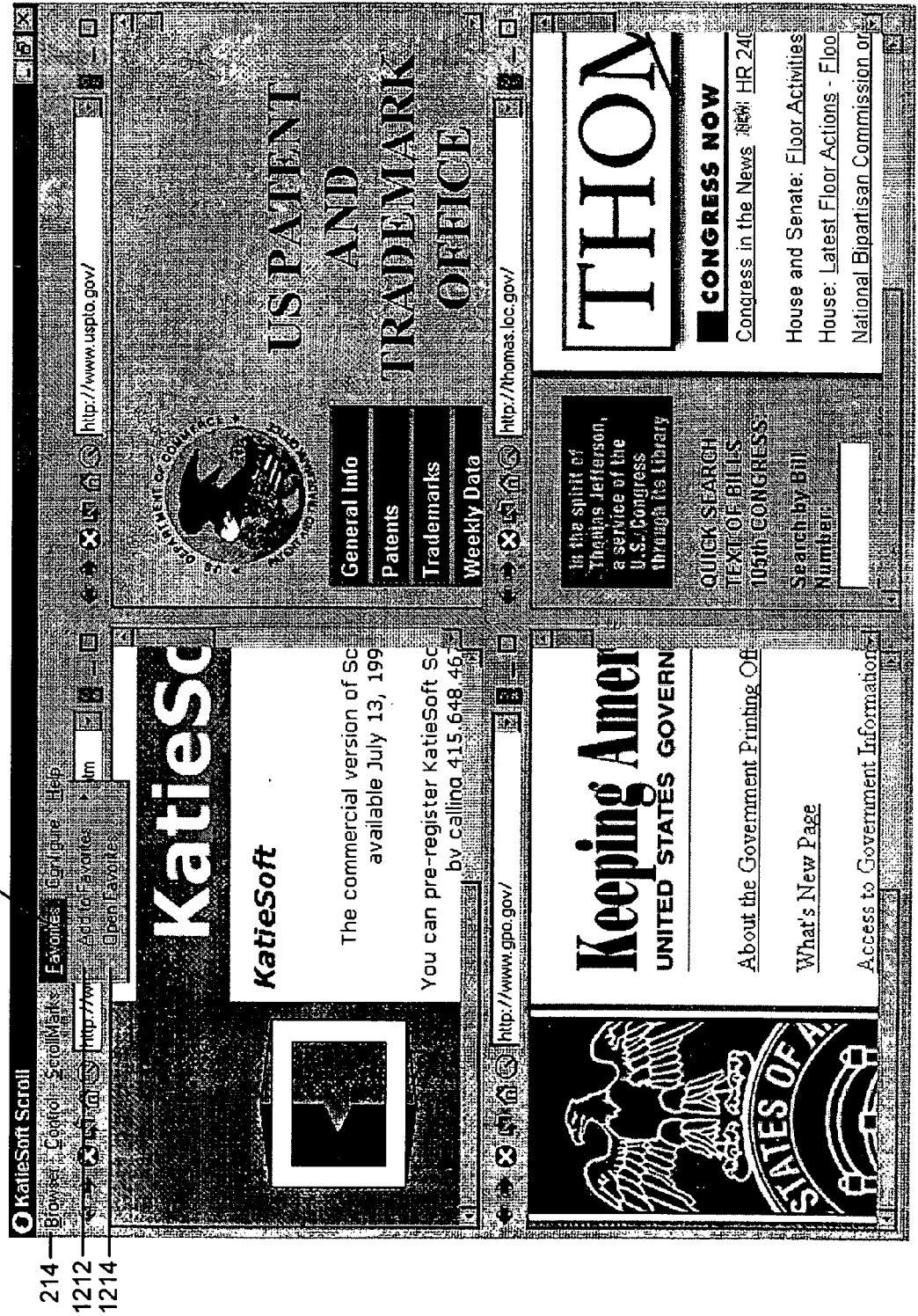
FIG. 12 is a screen display of the web page display system of FIG. 2 used to display and select from a main Favorites menu.
Figure 13:
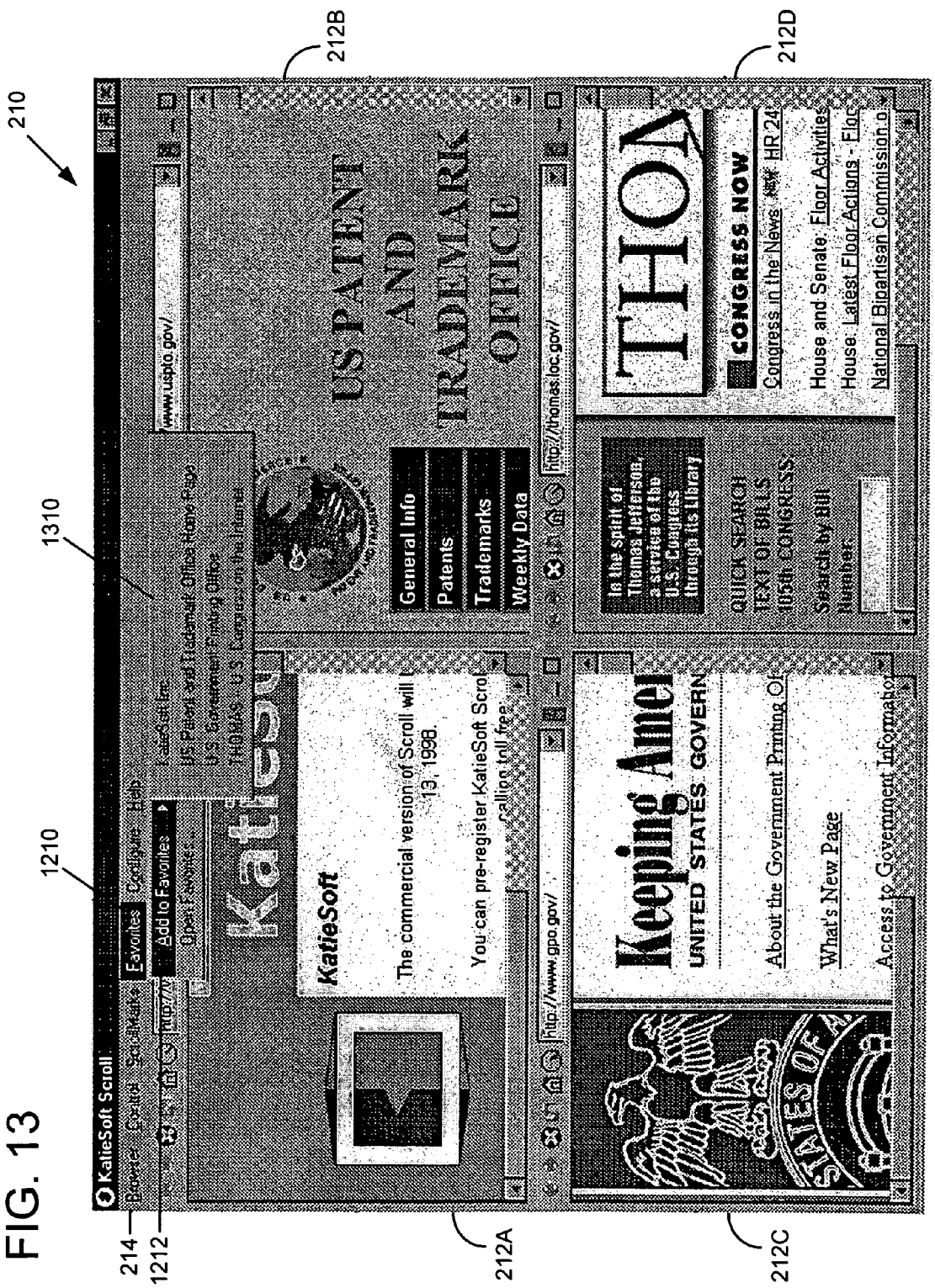
FIG. 13 is a screen display of the web page display system of FIG. 2 used to display and select a web page to be added to a Favorites list.

A Favorites menu 1210 of the pop-down menu controls 214 having Add to Favorites selection 1212 and Open Favorites selection 1214 is shown in FIG. 12. The Add to Favorites selection 1212 as shown in FIG. 13 when selected displays an Add to Favorites list 1310. The Add to Favorites list 1310 allows a user to select by description or title, any of the web pages currently being displayed. Selection of any of the web pages causes the URL of the selected web page to be added to a Favorites list. The Favorites list is permanently stored in computer 112 on a disk drive (not shown).

Any web page in the Favorites list can be accessed by using the Open Favorites selection 1214, as shown in FIG. 12. Selection of the Open Favorites selection 1214 opens the Favorites list which has brief descriptions or titles of stored URLs. A user opens a desired web page by selecting a web page title or description using the drag-and-drop feature of the mouse input device 120. The user drags the web page description or title into one of the display panes 212 and the mouse button 120a. Once a user releases a desired web page description or title into a display pane 212, the web page display system then automatically downloads the desired web page using the stored URL of the desired web page. The desired web page is downloaded into the web page display system and is displayed on a display pane 212 in which the title or description of the desired web page was dropped by the user.

The ability to drag and drop URLs from the Favorites list into any display pane 212 provides the user with powerful navigation tools. Similarly, the user can also drag and drop any URL that is displayed in one display pane 212 into another display pane 212 to automatically select downloading of a web page that has the particular URL. For instance, in one case display pane 212a displays a list of URLs from a search performed by a user. The user then drags and drops one of the URLs displayed in display pane 2112a into display pane 212b. The web page display system of the present embodiment then downloads the web page corresponding to the URL dropped into the display pane 212b. Subsequently, the display pane 212b displays the downloaded web page.

In an alternative embodiment, the web page display is executed in a windows environment such as Microsoft Active Desktop in conjunction with the Internet Explorer engine which allows the Favorites menu 1210 of the pop-down menu controls 214 to directly display titles and descriptions associated with URLs that are also stored in the Favorites list. A user then has an option of selecting a URL directly from the Favorites menu 1210 or the Favorites list. As part of this alternative embodiment, a user selects a URL directly from the Favorites menu 1210 by positioning a display cursor over a desired URL title or description on the Favorites menu 1210 and then a first single click of the mouse button 120a of the mouse input device 120 is performed. After the first single click of the mouse button 120a, the display cursor is displayed as a graphical object different than displayed before performance of the first single click. For example, the display cursor may change from an arrow to an cross-hairs after the first click of the mouse button 120a. With the mouse input device 120, the user then moves the display cursor (eg. the cross-hairs) into an area of a desired one of the currently active display panes 212 and then performs a second single click of the mouse button 120a. This initiates download of a desired web page associated with the desired URL and subsequent display of the desired web page in the desired display pane 212. The display cursor is then displayed as it was displayed before the first single click of the mouse button 120a was performed.

Figure 14:
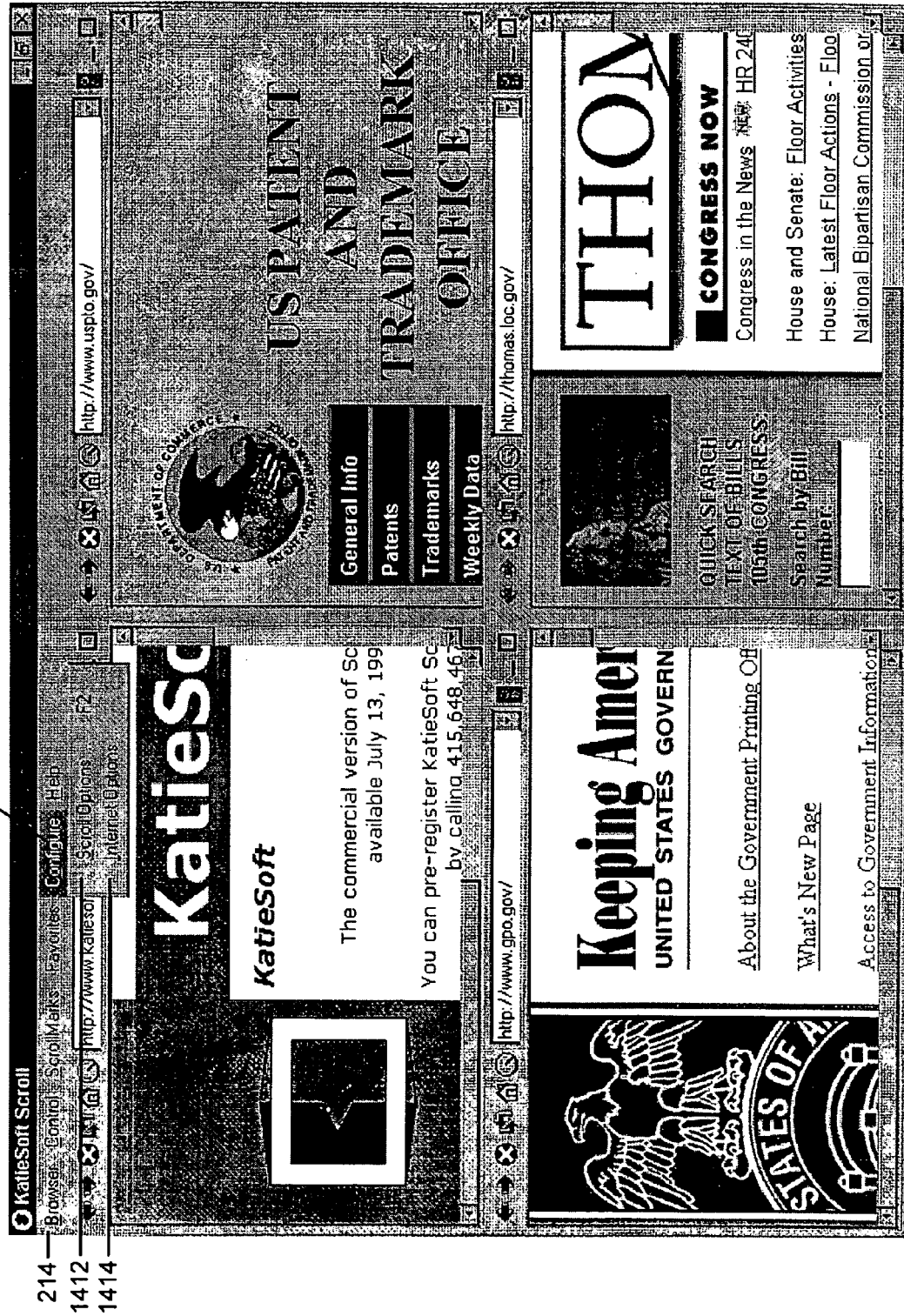
FIG. 14 is a screen display of the web page display system of FIG. 2 used to display and select from a main Configure menu.

A Configure menu 1410 of the pop-down menu controls 214 has a Scroll Options selection 1412 and an Internet Options selection 1414, as shown in FIG. 14. When the Internet Options selection 1414 of the Configure menu 1410 is selected, various Internet configuration options well known in the art are accessed. By selecting the Scroll Options selection 1412 of the Configure menu 1410, a user can access various menus for configuration illustrated in FIGS. 15-17.

Figure 15:
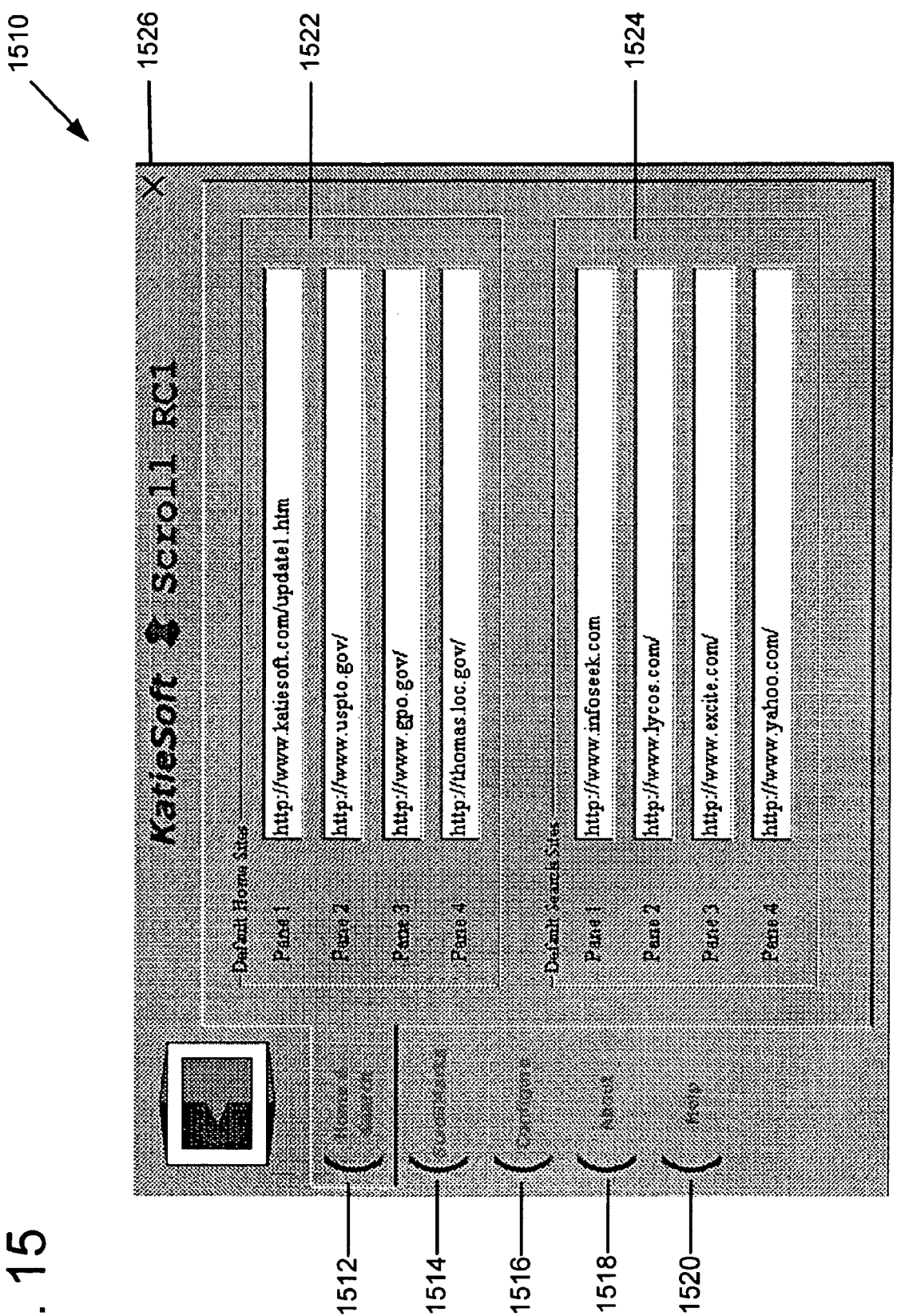
FIG. 15 is a screen display of the Home and Search default settings screen of the web page display system of FIG. 1.

A configuration menu system 1510, shown in FIG. 15, is accessed by activating the Scroll Options selection 1412 (see FIG. 14) of the Configure menu 1410 of the pop-down menu controls 214. The configuration menu system 1510 has a Home and Search selection 1512, a Scroll Marks selection 1514, a Configure selection 1516, an About selection 1518, and a Help selection 1520. Activation of the About selection 1518 and the Help selection 1520 provides information about the particular release number of the current menu display system and help information about particular functions and features of the web page display system. These functions are well known and need not be described herein. As shown on FIG. 15, two lists of URLs are displayed when the Home and Search selection 1512 is selected. A Default Home Sites list 1522 of the Home and Search Selection 1512 contains URLs for the predetermined web page sites for display panes 212a-d. Panes 1-4 on the Default Home Sites list 1522 correspond to display panes 212a-d, respectively.

For example, Pane 1 shown in FIG. 2 has a URL of "http://www.katiesoft.com/update1.htm." Given this designation for the default home site of display pane 212a, when a user selects the home control 228 of the individual display pane 212a shown in FIG. 2, a web page having an address with the URL of "http://www.katiesoft.com/update1.htm" is downloaded into the web page display system and displayed in display pane 212a. If the two web page display 610 is currently being displayed, then Pane 2 would also be used for display pane 212b. If the three web page display 510 is being used, then Panes 1-3 would be used. Finally, if the four web page display 210 is being used, then Panes 1-4 would be used. The Default Search Sites list 1524 is used in a manner similar to the way in which the Default Home Sites list 1522 is used. For the case of the Default Search Sites list 1524, the search controls 230 of the individual display panes 212 are used to activate the corresponding Default Search Sites list 1524. It should be noted that the user can independently specify a default home web site and a default search web site for each display pane. Although illustrated with four display panes 212a-212d, the present invention is not limited by the number of display panes.

Figure 16:
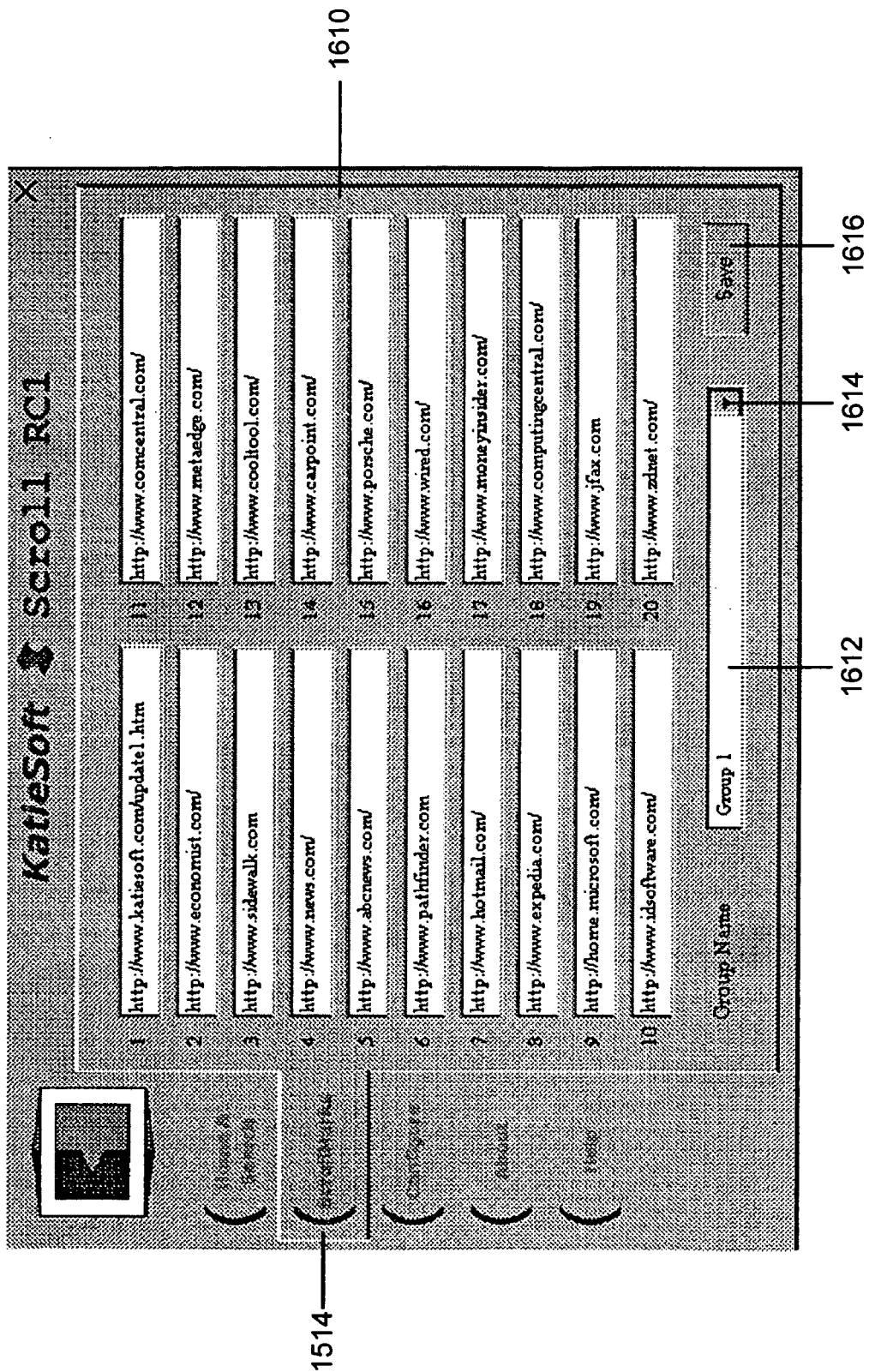
FIG. 16 is a screen display of the ScrollMarks settings screen of the web page display system of FIG. 1 to select multiple web pages for display as a group.
Figure 17:
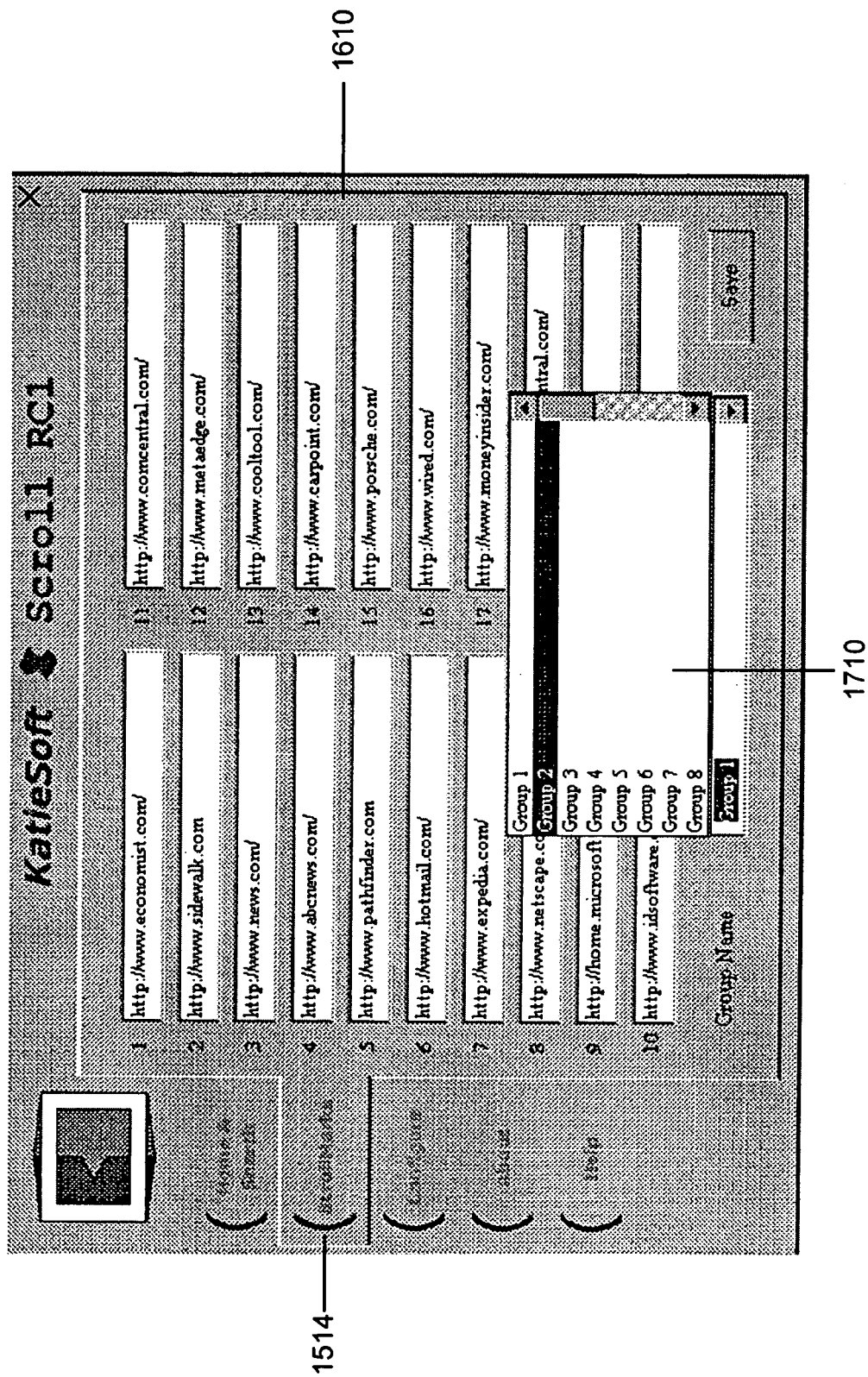
FIG. 17 is a screen display of the group menu of the ScrollMarks settings screen used to display and select a group of multiple web pages for display.

When the ScrollMarks selection 1514 of the configuration menu system 1510 has been selected, a group of URLs 1610 is displayed, as illustrated in FIG. 16. A list of URLs 1610 is shown for a group having a group name 1612 of "Group 1." However, the user may select any convenient group name. Selection tab 1614 allows a user to select other groups from a pop-down list of groups 1710, as shown in FIG. 17. Other groups may be readily selected by the user with conventional "point and click" techniques using the mouse input device 120 (see FIG. 1). When another group is selected, the list of URLs 1610 changes to the list of URLs of the currently selected group. The user can edit the currently selected list using conventional editing techniques. A Save button 1616 of the Scroll Marks selection 1514 is selected by a user to save any changes made to the currently displayed URL list 1610. The currently displayed URL list 1610 of the configuration menu system 1510 is also shown by the URL indicators 232 when the access control 234 is selected, as shown in FIG. 2. Since each display pane 212 has a URL indicator 232, each display pane 212 displays the current URL list 1610 when the access control 234 of any one of the display panes 212 is selected.

Figure 18:
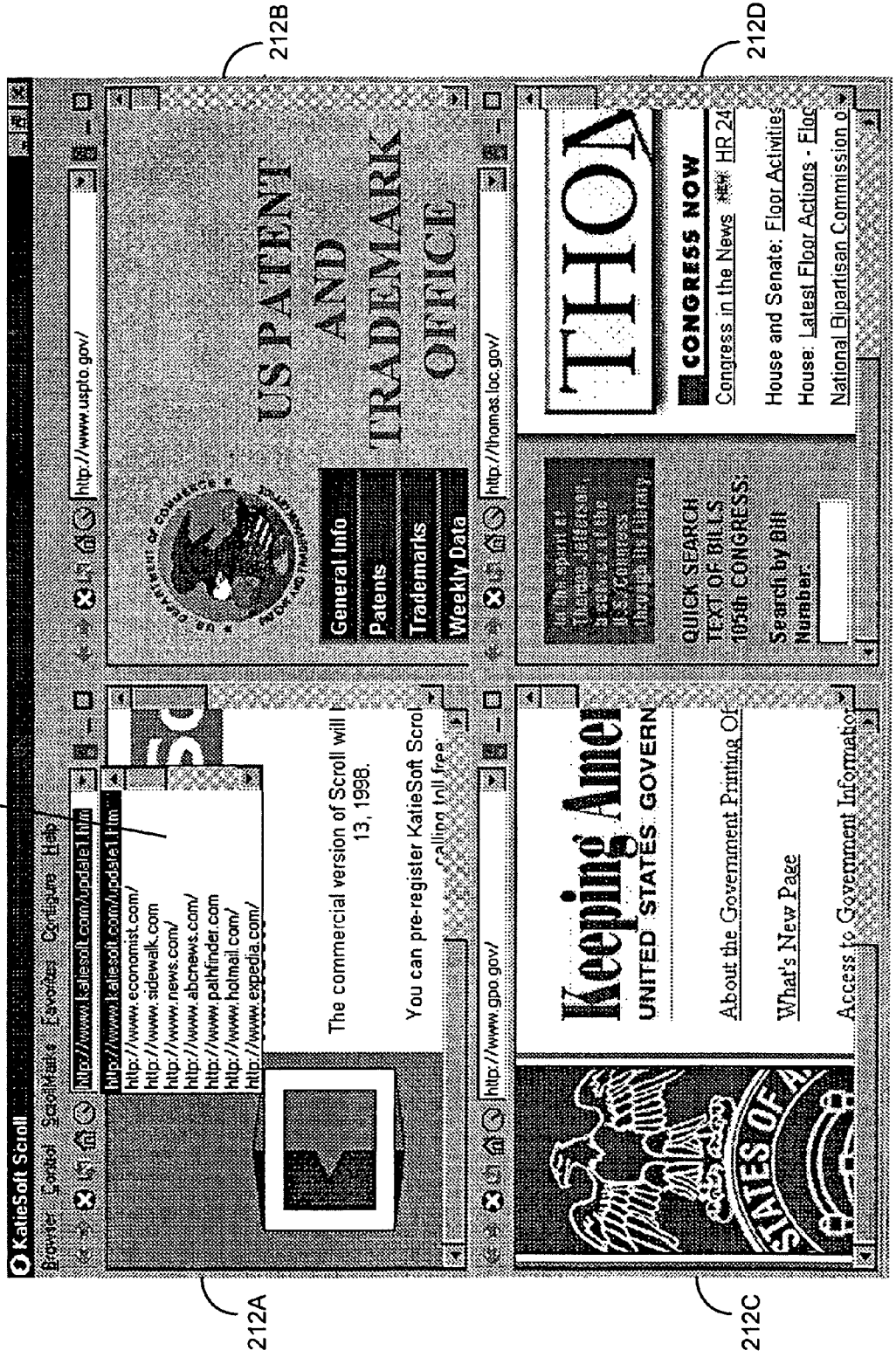
FIG. 18 is a screen display of the web page display system of FIG. 2 used to display and select a web page site for an individual web page pane.

For example, a user can create groups of URL list containing up to twenty web pages on the subjects of fishing, baseball, investments, education, or the arts. To access web pages on a particular subject, the user first selects the group corresponding to the particular subject of interest and then manually selects a web page from the selected URL list 1610 through the use of the URL indicator 232 and the access control 234 of one or more display panes 212. FIG. 18 illustrates a pop-down list of URLs 1810 displayed in the URL indicator 232 of the display pane 212a. The user can go directly to one of these listed URLs by using point and click features of the mouse input device 120. Alternatively, the user can scroll through the web pages of the selected URL list 1610 by using the Scroll Forward selection 1116 or the Scroll Back selection 1118 of the ScrollMarks menu 1110 shown in FIG. 11.

Figure 19:
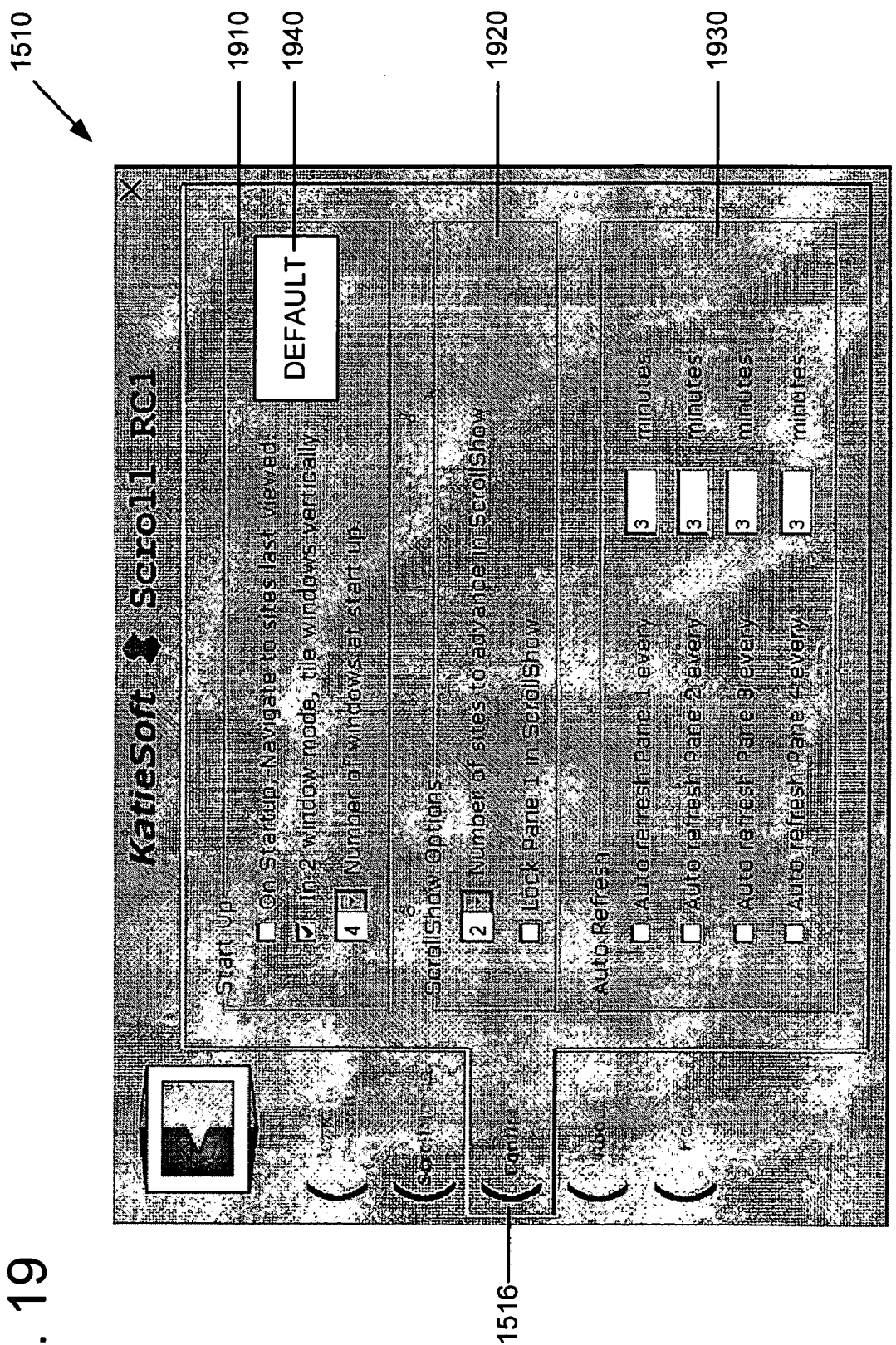
FIG. 19 is a screen display of the Configure screen of the web page display system of FIG. 1.

FIG. 19 illustrates the Configure selection 1516 (see FIG. 15) of the configuration menu system 1510, including Start Up options 1910, ScrollShow options 1920, and Auto Refresh options 1930. The Start Up options 1910 include a checkbox for navigating to sites last viewed on startup, a checkbox for tiling the display panes 212 vertically in the two web page display 610 (see FIG. 6), and a user-selectable option for a designated number of display panes 212 displayed on startup of the web page display system.

The ScrollShow options 1920 include a user-selectable option for a number of web page sites to advance back or forward when the Scroll forward 1116 (see FIG. 11) or Scroll Back 1118 selection is selected, and a checkbox to lock the display pane 212a in the ScrollShow mode such that the web page displayed in the display pane 2112a is not changed when a user scrolls forward or backwards using the Scroll Forward selection 1116 (see FIG. 11) or the Scroll Back selection 1118 of the ScrollMarks menu 1110. The Auto Refresh options 1930 include a checkbox to allow autorefresh for each of the display panes 212a-212d and a user-selectable option that allows the user to designate how-often the currently displayed web page in each individual display pane 212 is downloaded from the web page site to refresh the display.

In a further embodiment, a "Default" check box is found in the configuration menu system 1510. Activation of the Default checkbox 1940 of FIG. 19 changes file associations stored in the registry file of the computer operating system to select the present invention as the default browser. Procedures for changing file associations are well known in the art. As a result of the modified file associations, if the URL of a particular htm, http, html, or similar file is activated by a user typically clicking on the URL using the input mouse device 120, execution of the web page display of the further embodiment is initiated if the web page display is not already active. The URL is found typically in word processing documents, e-mail documents or other computer files typically not displayed with a web browser. The associated htm, http, html, or similar files are typically found on a web site 132 on a network 130 or a local computer workstation user terminal 110.

Figure 20:
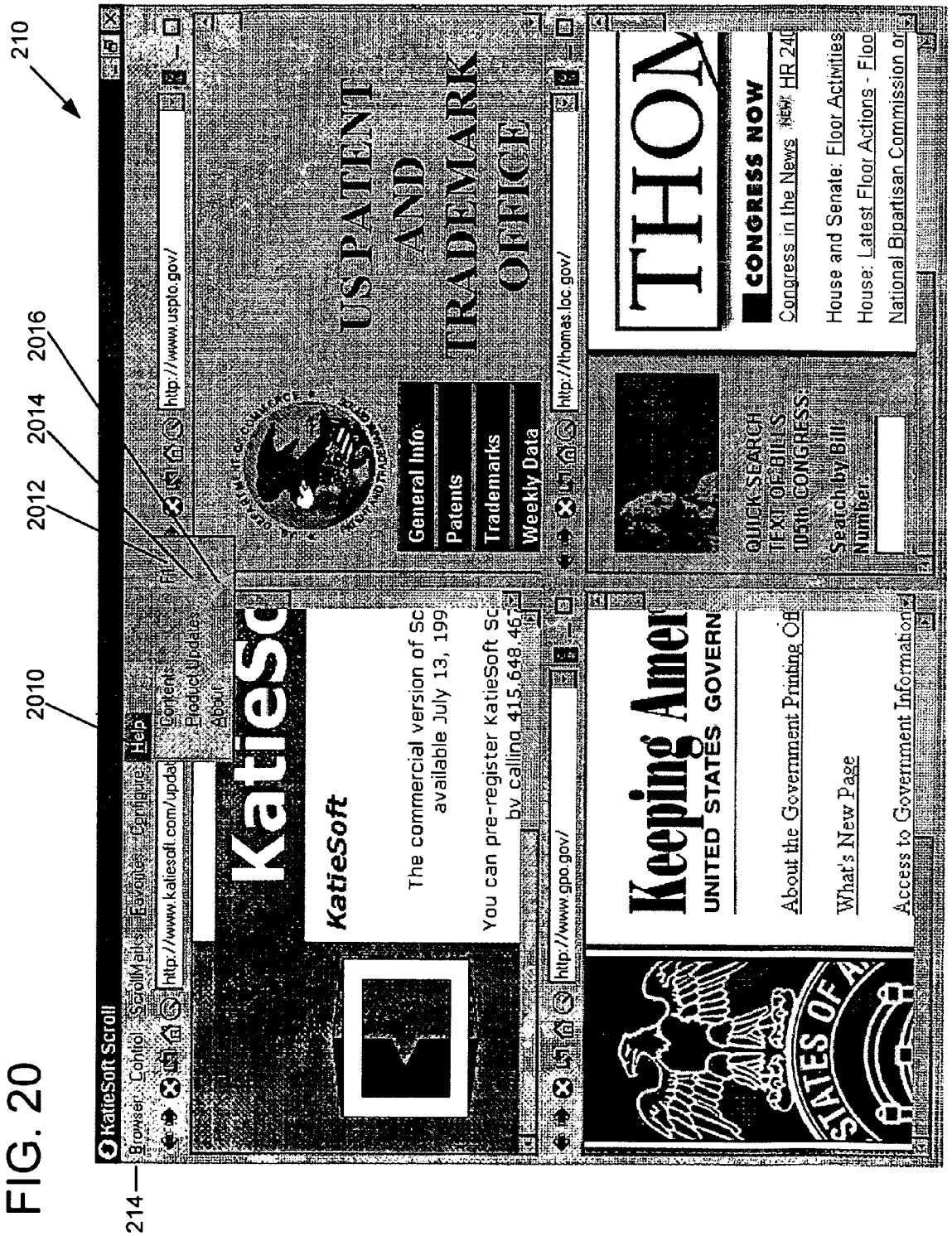
FIG. 20 is a screen display of the web page display system of FIG. 2 used to display and select from a main Help menu.

FIG. 20 illustrates a help menu 2010 of the pop-down menu control 214, which has a Contents selection 2012, a Product Updates selection 2014, and an About selection 2016. The Contents selection 2012 and the About selection 2016 access the configuration menu system 1510. The Product Updates selection 2014 accesses a web page containing information about product updates of the web page display system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention climed is:

1. A method of displaying a plurality of web pages via a plurality of display areas configured to display a received web page, the method comprising:

receiving an indication from a user to display web pages listed in a list of web page addresses; and upon receiving the indication from the user, activating a group of the plurality of display areas to each display a web page received from a respective web page address contained in the list of web page addresses; wherein: the list of web page addresses has an order; the display areas are ordered; and activating a group of the plurality of display areas to each display a web page comprises displaying web pages from the list of web page addresses according to the order of the list of web page addresses and the order of the display areas; and wherein the method further comprises: receiving one or more ordered lists of web page addresses; storing the received one or more ordered lists of web page addresses to a data storage area; and selecting a first set of web page addresses from one of the received one or more ordered lists of web page addresses; and wherein displaying web pages from the list of web page addresses comprises activating a group of the plurality of display areas to each display a web page received from a respective web page address contained in the selected first set of web page addresses.

2. The method of claim 1, further comprising:
requesting web pages from web page sites associated with addresses listed in the list of web page addresses;
receiving the requested web pages; and
displaying the web pages during the activating.

3. The method of claim 1, wherein the plurality of display areas comprise a plurality of non-overlapping display areas.

4. The method of claim 1, wherein receiving one or more ordered lists of web page addresses comprises:
displaying a web page address list configuration control to a user; and
receiving one or more ordered lists of web page addresses via the displayed web page address list configuration control.

5. The method of claim 4, further comprising:
receiving via the web page address list configuration control an indication of a first set of web page addresses from one of the stored one or more lists of web page addresses; and
receiving via the web page address list configuration control an indication of a second set of web page addresses from one of the stored one or more lists of web page addresses.

6. The method of claim 5, wherein:
selecting a first set of web page addresses to display comprises selecting the indicated first set of web page addresses;
the indicated second set of web page addresses has an order; and
the method further comprises:
receiving a second indication from a user to display web pages from a list of web page addresses; and
activating a group of the plurality of display areas to each display a web page received from a respective web page address contained in the indicated second set of web page addresses to replace currently-displayed web pages according to the order of the indicated second set of web page addresses and the order of the display areas.

7. The method of claim 4, wherein the display further comprises a scroll control to control an advancement of web pages; and
wherein the method further comprises:
receiving an indication that the scroll control has been activated;

subsequent to receiving the indication that the scroll control has been activated, selecting a second set of web page addresses from the list of web page sites from which currently-displayed web pages have been received, the second set selected to advance sequentially through the ordered list of web page addresses from which the first and second selected sets are selected for at least one of the plurality of display areas; and activating a group of the plurality of display areas to each display a web page received from a respective web page address contained in the second set of web page addresses.

8. The method of 7, wherein:

the display further comprises one or more scroll lock controls;

the method further comprises receiving an indication that a scroll lock control has been activated to designate a selected display area such that the group of display areas is activated to each display a web page received from web page addresses which advance sequentially are display areas other than the display area designated by activation of the scroll lock; and activating the group of the plurality of display areas to each display a web page comprises activating display areas other than the display area designated by the activation of the scroll lock control.

9. One or more computer-readable media containing instructions which, when executed on a computer, cause the computer to perform a method, the method comprising: displaying a plurality of display areas for a user, each display area configured to display a received web page; receiving an indication from the user to display web pages listed in a list of web page addresses; and activating a group of the plurality of display areas to each display a web page received from a respective web page address contained in the list of web page addresses; wherein: the list of web page addresses has an order; the display areas are ordered; and activating a group of the plurality of display areas to each display a web page comprises displaying web pages from the list of web page addresses according to the order of the list of web page addresses and the order of the display areas; and wherein the method further compnses: receiving one or more ordered lists of web page addresses; storing the received one or more ordered lists of web page addresses to a data storage area; and selecting a first set of web page addresses from one of the received one or more ordered lists of web page addresses; and wherein displaying web pages from the list of web page addresses comprises activating a group of the plurality of display areas to each display a web page received from a respective web page address contained in the selected first set of web page addresses.

10. The computer-readable media of claim 9, wherein receiving one or more ordered lists of web page addresses comprises:

displaying a web page address list configuration control to a user; and receiving one or more ordered lists of web page addresses via the displayed web page address list configuration control; and wherein the method further comprises:

receiving via the web page address list configuration control an indication of the first set of web page addresses from one of the stored one or more lists of web page addresses; and receiving via the web page address list configuration control an indication of a second set of web page addresses from one of the stored one or more lists of web page addresses.

11. The computer-readable media of claim 10, wherein:

selecting a first set of web page addresses to display comprises selecting the indicated first set of web page addresses;

the indicated second set of web page addresses has an order; and the method further comprises:

receiving a second indication from a user to display web pages listed in a list of web page addresses; and activating a group of the plurality of display areas to each display a web page received from a respective web page address contained in the indicated second set of web page addresses to replace currently-displayed web pages according to the order of the indicated second set of web page addresses and the order of the display areas.

12. The computer-readable media of claim 9, wherein receiving one or more ordered lists of web page addresses comprises:

displaying a web page address list configuration control to a user; and receiving one or more ordered lists of web page addresses via the displayed web page address list configuration control; and wherein the display further comprises a scroll control to control an advancement of web pages; and wherein the method further comprises:

receiving an indication that the scroll control has been activated;

subsequent to receiving an indication that the scroll control has been activated, selecting a second set of web page addresses from the list of web page addresses from which currently-displayed web pages were received, the second set selected to advance sequentially through the ordered list from which the first and second selected sets are selected for at least one of the plurality of display areas; and activating a group of the plurality of display areas to each display a web page received from a respective web page address contained in the second set of web page addresses.

13. A method of displaying a plurality of web pages via a plurality of display areas, the method comprising:

displaying a plurality of ordered display areas for a user, the display areas configured to display respective received web pages;

displaying a web page address list configuration control to a user;

displaying a scroll control to control an advancement of web pages;

receiving one or more ordered lists of web page addresses via the displayed web page address list configuration control;

storing the received one or more ordered lists of web page addresses to a data storage area;

selecting a first set of web page addresses from one of the received one or more ordered lists of web page addresses;

receiving an indication from the user to display the first set of web page addresses;

activating a group of the plurality of display areas to each display a web page received from a respective web page address contained in the one or more ordered lists of web page addresses by displaying web pages from the set of web page addresses according to the order of the set of web page addresses and the order of the display areas;

receiving an indication that the scroll control has been activated;

subsequent to receiving an indication that the scroll control has been activated, selecting a second set of web page addresses from a list of web page addresses from which currently-displayed web pages were received, the second set selected to advance sequentially through the ordered list from which the first and second selected sets are selected for at least one of the plurality of display areas; and activating a group of the plurality of display areas to each display a web page received from a respective web page address contained in the second set of web page addresses.

* * * * *